(12) United States Patent
Yun et al.

(10) Patent No.: US 12,057,643 B2
(45) Date of Patent: Aug. 6, 2024

(54) ANTENNA CLAMPING DEVICE AND CONTROL METHOD THEREFOR

(71) Applicant: KMW INC., Hwaseong-si (KR)

(72) Inventors: Min Seon Yun, Hwaseong-si (KR); Gyeong Tae Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 200 days.

(21) Appl. No.: 17/670,461

(22) Filed: Feb. 13, 2022

(65) Prior Publication Data

US 2022/0166134 A1    May 26, 2022

Related U.S. Application Data

(63) Continuation of application No. PCT/KR2020/010736, filed on Aug. 13, 2020.

(30) Foreign Application Priority Data

| Aug. 16, 2019 | (KR) | 10-2019-0100203 |
| Mar. 12, 2020 | (KR) | 10-2020-0030508 |

(51) Int. Cl.
| *H04N 7/18* | (2006.01) |
| *H01Q 3/00* | (2006.01) |
| *H01Q 3/08* | (2006.01) |

(52) U.S. Cl.
CPC ............... *H01Q 3/005* (2013.01); *H01Q 3/08* (2013.01); *H04N 7/185* (2013.01)

(58) Field of Classification Search
CPC .......... H04N 7/185; H04N 7/188; H01Q 3/08; H01Q 3/005; H01Q 1/125
See application file for complete search history.

(56) References Cited

U.S. PATENT DOCUMENTS

| 5,227,806 A |   | 7/1993 | Eguchi |             |
| 9,836,048 B1 | * | 12/2017 | Widmaier | B63H 21/21 |

(Continued)

FOREIGN PATENT DOCUMENTS

| GB | 2569123 A   | 6/2019 |
| JP | H05-168198 A | 7/1993 |

(Continued)

OTHER PUBLICATIONS

International search report mailed Nov. 19, 2020 for International application No. PCT/KR2020/010736 and its English translation.

(Continued)

*Primary Examiner* — Eileen M Adams
(74) *Attorney, Agent, or Firm* — Insight Law Group, PLLC; Seung Lee

(57) ABSTRACT

The present invention relates to an antenna clamping device and a method of controlling the same, and particularly, the antenna clamping device includes a tilting rotation motor configured to rotate an antenna in a vertical direction, a tilting rotation prevention motor configured to lock or unlock a vertical rotation of the antenna, a rotating rotation motor configured to rotate the antenna in a horizontal direction, a rotating rotation prevention motor configured to lock or unlock a horizontal rotation of the antenna, and a controller configured to adjust a direction of the antenna by controlling the tilting rotation motor, the tilting rotation prevention motor, the rotating rotation motor, and the rotating rotation prevention motor, thereby improving operation convenience.

22 Claims, 17 Drawing Sheets

(56) References Cited

U.S. PATENT DOCUMENTS

| | | | |
|---|---|---|---|
| 2015/0054703 A1* | 2/2015 | Yano | H01Q 21/064 |
| | | | 343/762 |
| 2016/0211576 A1 | 7/2016 | Vassilakis | |
| 2016/0336651 A1 | 11/2016 | Anderson | |
| 2017/0074488 A1* | 3/2017 | Fujisawa | F21S 8/04 |

FOREIGN PATENT DOCUMENTS

| | | |
|---|---|---|
| JP | H07-42212 U | 2/1995 |
| JP | 07-86818 A | 3/1995 |
| JP | 07-42212 U | 7/1995 |
| JP | H07-249920 A | 9/1995 |
| JP | 2009-290416 A | 12/2009 |
| JP | 2012-500548 A | 1/2012 |
| JP | 2017-192030 A | 10/2017 |
| KR | 10-1998-0044529 A | 9/1998 |
| KR | 10-2007-0111625 A | 11/2007 |

OTHER PUBLICATIONS

Non-final Office Action mailed Mar. 7, 2023 from the Japanese Patent Office for Japanese Application No. 2022-509136.
Extended European Search Report mailed on Nov. 27, 2023 from the European Patent Office for European Application No. 20855177.0.

* cited by examiner

ANTENNA CLAMPING DEVICE AND CONTROL METHOD THEREFOR

CROSS-REFERENCE TO RELATED APPLICATIONS

This application is a Continuation of International Application No. PCT/KR2020/010736, filed on Aug. 13, 2020, which claims the benefit of and priority to Korean Patent Application Nos. 10-2019-0100203, filed on Aug. 16, 2019; and 10-2020-0030508, filed on Mar. 12, 2020, the disclosure of which are herein incorporated by reference in their entirety.

TECHNICAL FIELD

The present invention relates to an antenna clamping device and a method of controlling the same, and more particularly, to an antenna clamping device and a method of controlling the same, which are capable of efficiently disposing an antenna in a dense installation space and easily adjusting a direction of the antenna.

BACKGROUND ART

In general, as an example of wireless communication technologies, a multiple-input/multiple-output (MIMO) technology refers to a technology for innovatively increasing data transmission capacity by using a plurality of antennas. This technology uses a spatial multiplexing technique, in which a transmitter transmits different data through the respective transmission antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, if the number of antennas increases to ten, the channel capacity of about 10 times is ensured by using the same frequency band in comparison with the current single antenna system.

Eight antennas are used in 4G LTE-advanced, and a product equipped with 64 or 128 antennas has been developed in a current pre-5G step. It is expected that base station equipment having a much large number of antennas will be used in 5G, which refers to a massive MIMO technology. The current cell management is 2-dimension, but 3D-beam-forming may be enabled when the massive MIMO technology is introduced, which also represents a full-dimension (FD) MIMO.

In the massive MIMO technology, the number of transmitters and the number of filters are increased as the number of antennas (ANTs) is increased. Nevertheless, because of cost of lease or spatial restriction in respect to an installation location, RF components (antennas, filters, power amplifiers, transceivers, etc.) are practically manufactured to be small in size, light in weight, and inexpensive. Further, the massive MIMO requires a high output to expand a coverage, but electric power consumption and heat generation, which are caused by the high output, have a negative effect on reductions in weight and size.

In particular, to install the MIMO antenna, in which modules including RF elements and digital elements are coupled in a layered structure, in a limited space, there is a need for compact and miniaturized design of a plurality of layers constituting the MIMO antenna in order to maximize ease of installation or spatial utilization. Further, there is a strong need for free adjustment of directions of an antenna apparatus installed on a single support pole.

In the related art, because an operator needs to directly ascend the support pole up to a high position to adjust the direction of the MIMO antenna installed in the limited space, there is a problem in that a risk of falling accident is increased and thus working stability significantly deteriorates.

DISCLOSURE

Technical Problem

A technical object of the present invention is to provide an antenna clamping device and a method of controlling the same, which are capable of preventing a falling accident of an operator at the time of adjusting a direction of an antenna.

Another technical object of the present invention is to provide an antenna clamping device and a method of controlling the same, which are capable of easily adjusting a direction of an antenna and preventing the occurrence of abnormal noise by easily absorbing fine vibration caused by the antenna installed outside.

The technical problems of the present invention are not limited to the aforementioned technical problem, and other technical problems, which are not mentioned above, may be clearly understood by those skilled in the art from the following descriptions.

Technical Solution

To achieve the above-mentioned objects, the present invention provides an antenna clamping device including: a tilting rotation motor configured to rotate an antenna in a vertical direction; a tilting rotation prevention motor configured to lock or unlock a vertical rotation of the antenna; a rotating rotation motor configured to rotate the antenna in a horizontal direction; a rotating rotation prevention motor configured to lock or unlock a horizontal rotation of the antenna; and a controller configured to adjust a direction of the antenna by controlling the tilting rotation motor, the tilting rotation prevention motor, the rotating rotation motor, and the rotating rotation prevention motor.

The antenna clamping device according to the present invention may further include an information reception unit configured to receive information on a rotation angle of the antenna transmitted from a remote control center and transmit the information to the controller, and the controller may control the tilting rotation motor, the tilting rotation prevention motor, the rotating rotation motor, and the rotating rotation prevention motor on the basis of the information on the rotation angle of the antenna received from the information reception unit.

The information reception unit may receive, through mobile communication network, the information on the rotation angle of the antenna transmitted from the remote control center.

The information reception unit may receive, through a relay device, the information on the rotation angle of the antenna transmitted from the remote control center.

When the information on the rotation angle of the antenna is inputted from the information reception unit, the controller may unlock the vertical rotation of the antenna and the horizontal rotation of the antenna by controlling the tilting rotation prevention motor and the rotating rotation prevention motor and adjust a vertical rotation angle of the antenna and a horizontal rotation angle of the antenna by controlling the tilting rotation motor and the rotating rotation motor.

The controller may control any one of the tilting rotation prevention motor and the rotating rotation prevention motor first before controlling the other of the tilting rotation prevention motor and the rotating rotation prevention motor, and the controller may control any one of the tilting rotation motor and the rotating rotation motor first before controlling the other of the tilting rotation motor and the rotating rotation motor.

The controller may control the tilting rotation prevention motor and the rotating rotation prevention motor simultaneously and control the tilting rotation motor and the rotating rotation motor simultaneously.

The antenna clamping device according to the present invention may further include an angle detection unit configured to detect a rotation angle of a rotary shaft of the tilting rotation motor and a rotation angle of a rotary shaft of the rotating rotation motor, and the controller may unlock the vertical rotation of the antenna and the horizontal rotation of the antenna and then adjust the vertical rotation angle of the antenna and the horizontal rotation angle of the antenna by operating the tilting rotation motor and the rotating rotation motor until a detected angle value transmitted from the angle detection unit is equal to a received angle value transmitted from the information reception unit.

The antenna clamping device according to the present invention may further include a pressure detection unit configured to detect a pressure for locking the vertical rotation of the antenna and a pressure for locking the horizontal rotation of the antenna, and when the controller receives the information on the rotation angle of the antenna from the information reception unit, the controller may unlock the vertical rotation of the antenna and the horizontal rotation of the antenna by operating the tilting rotation prevention motor and the rotating rotation prevention motor until a pressure value transmitted from the pressure detection unit is smaller than a value set in the controller.

The controller may adjust the vertical rotation angle of the antenna and the horizontal rotation angle of the antenna by controlling the tilting rotation motor and the rotating rotation motor and then lock the vertical rotation of the antenna and the horizontal rotation of the antenna by operating the tilting rotation prevention motor and the rotating rotation prevention motor until the pressure value transmitted from the pressure detection unit is larger than the value set in the controller.

The antenna clamping device according to the present invention may further include an image detection unit configured to detect a rotating state of the antenna as video data or image data, and the controller may transmit the video data or the image data detected by the image detection unit to a display unit provided on the remote control center or a display unit provided on a system terminal that operates in conjunction with the remote control center.

The present invention provides a method of controlling an antenna clamping device including a tilting rotation motor configured to rotate an antenna in a vertical direction, a tilting rotation prevention motor configured to lock or unlock a vertical rotation of the antenna, a rotating rotation motor configured to rotate the antenna in a horizontal direction, and a rotating rotation prevention motor configured to lock or unlock a horizontal rotation of the antenna, the method including: unlocking the vertical rotation of the antenna and the horizontal rotation of the antenna by controlling the tilting rotation prevention motor and the rotating rotation prevention motor; adjusting a vertical rotation angle of the antenna and a horizontal rotation angle of the antenna by controlling the tilting rotation motor and the rotating rotation motor; and locking the vertical rotation of the antenna and the horizontal rotation of the antenna by controlling the tilting rotation prevention motor and the rotating rotation prevention motor.

The antenna clamping device may further include an information reception unit, and the method of controlling the antenna clamping device according to the present invention may further include an angle information receiving step of receiving, by the information reception unit, information on a rotation angle of the antenna transmitted from a remote control center before the unlocking of the vertical rotation and the horizontal rotation. In the unlocking of the vertical rotation and the horizontal rotation and the locking of the vertical rotation and the horizontal rotation, the tilting rotation prevention motor and the rotating rotation prevention motor may be controlled on the basis of the information on the rotation angle of the antenna received from the information reception unit. In the adjusting of the vertical rotation angle and the horizontal rotation angle, the tilting rotation motor and the rotating rotation motor may be controlled on the basis of the information on the rotation angle of the antenna received from the information reception unit.

In the angle information receiving step, the information on the rotation angle of the antenna transmitted from the remote control center may be received through a mobile communication network.

In the angle information receiving step, the information on the rotation angle of the antenna transmitted from the remote control center may be received through a relay device.

In the unlocking of the vertical rotation and the horizontal rotation, the vertical rotation of the antenna and the horizontal rotation of the antenna may be unlocked as the tilting rotation prevention motor and the rotating rotation prevention motor are controlled when the information on the rotation angle of the antenna is inputted from the information reception unit.

In the unlocking of the vertical rotation and the horizontal rotation, any one of the tilting rotation prevention motor and the rotating rotation prevention motor may be controlled first before the other of the tilting rotation prevention motor and the rotating rotation prevention motor may be controlled, and in the adjusting of the vertical rotation angle and the horizontal rotation angle, any one of the tilting rotation motor and the rotating rotation motor may be controlled first before the other of the tilting rotation motor and the rotating rotation motor may be controlled, and in the locking of the vertical rotation and the horizontal rotation, any one of the tilting rotation prevention motor and the rotating rotation prevention motor may be controlled first before the other of the tilting rotation prevention motor and the rotating rotation prevention motor may be controlled.

In the unlocking of the vertical rotation and the horizontal rotation, the tilting rotation prevention motor and the rotating rotation prevention motor may be simultaneously controlled, and in the adjusting of the vertical rotation angle and the horizontal rotation angle, the tilting rotation motor and the rotating rotation motor may be simultaneously controlled, and in the locking of the vertical rotation and the horizontal rotation, the tilting rotation prevention motor and the rotating rotation prevention motor may be simultaneously controlled.

The antenna clamping device may further include an angle detection unit configured to detect a rotation angle of a rotary shaft of the tilting rotation motor and a rotation angle of a rotary shaft of the rotating rotation motor, and in the adjusting of the vertical rotation angle and the horizontal rotation angle, the tilting rotation motor and the rotating rotation motor may be operated until a detected angle value transmitted from the angle detection unit is equal to a received angle value transmitted from the information reception unit.

The antenna clamping device may further include a pressure detection unit configured to detect a pressure for locking the vertical rotation of the antenna and a pressure for locking the horizontal rotation of the antenna, and in the unlocking of the vertical rotation and the horizontal rotation, the tilting rotation prevention motor and the rotating rotation prevention motor may be operated until a pressure value transmitted from the pressure detection unit is smaller than a predetermined value.

In the locking of the vertical rotation and the horizontal rotation, the tilting rotation prevention motor and the rotating rotation prevention motor may be operated until the pressure value transmitted from the pressure detection unit is larger than the predetermined value.

The antenna clamping device may further include an image detection unit configured to detect a rotating state of the antenna as video data or image data, and the method of controlling the antenna clamping device according to the present invention may further include transmitting the video data or the image data detected by the image detection unit to a display unit, which is provided on the remote control center, or a display unit, which is provided on a system terminal that operates in conjunction with the remote control center, before the angle information receiving step.

Other detailed matters of the embodiment are included in the detailed description and the drawings.

Advantageous Effects

According to the antenna clamping device and the method of controlling the same according to the present invention, the operator may remotely adjust the direction of the antenna apparatus installed in the limited space, thereby improving the operation convenience.

The effects of the present invention are not limited to the aforementioned effects, and other effects, which are not mentioned above, will be clearly understood by those skilled in the art from the claims.

BEST MODE

Figure 1:
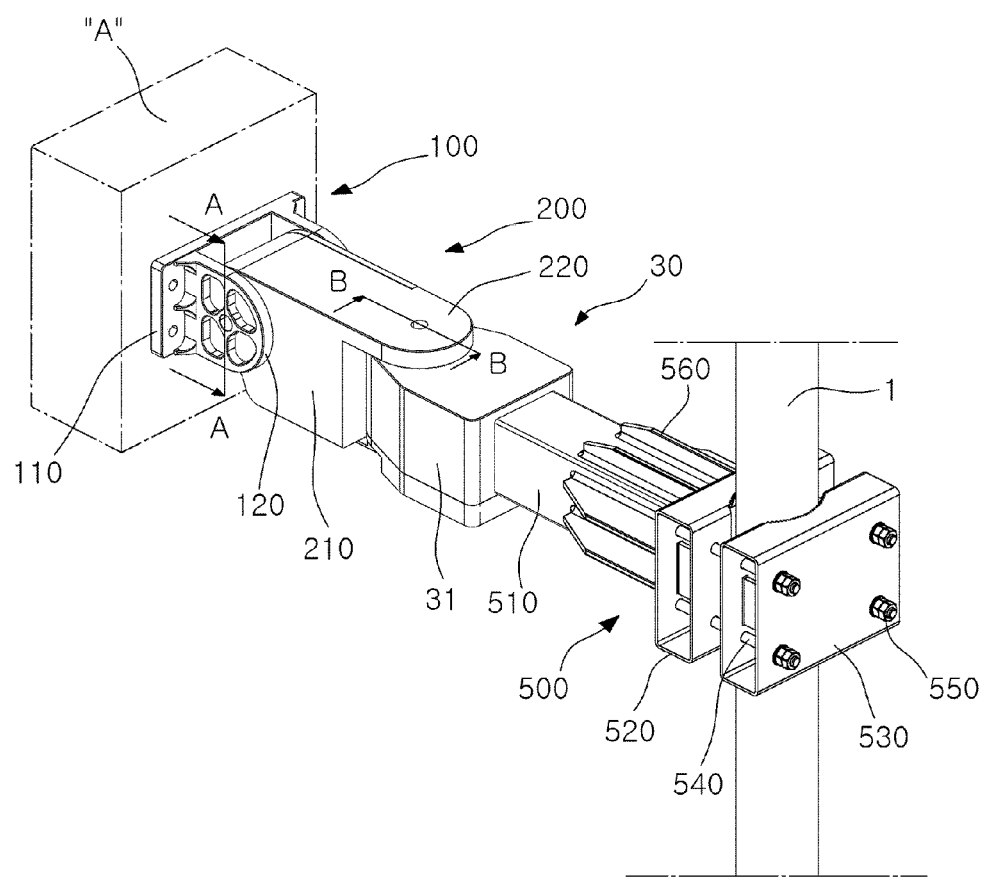
FIG. 1 is a perspective view illustrating a state in which an antenna clamping device according to an embodiment of the present invention is installed on a support pole.

Hereinafter, an embodiment of a method of controlling an antenna clamping device according to the present invention will be described in detail with reference to the accompanying drawings. In assigning reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of publicly known configurations or functions incorporated herein will be omitted when it is determined that the detailed description obscures the subject matters of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Figure 2:
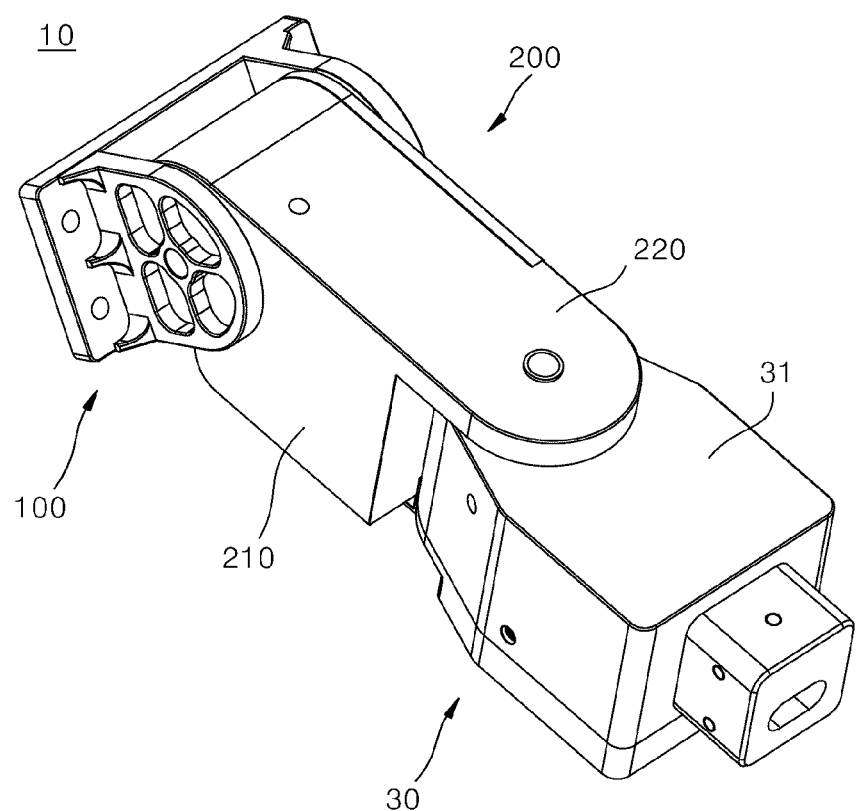
FIG. 2 is a perspective view illustrating the antenna clamping device according to the embodiment of the present invention.
Figure 3:
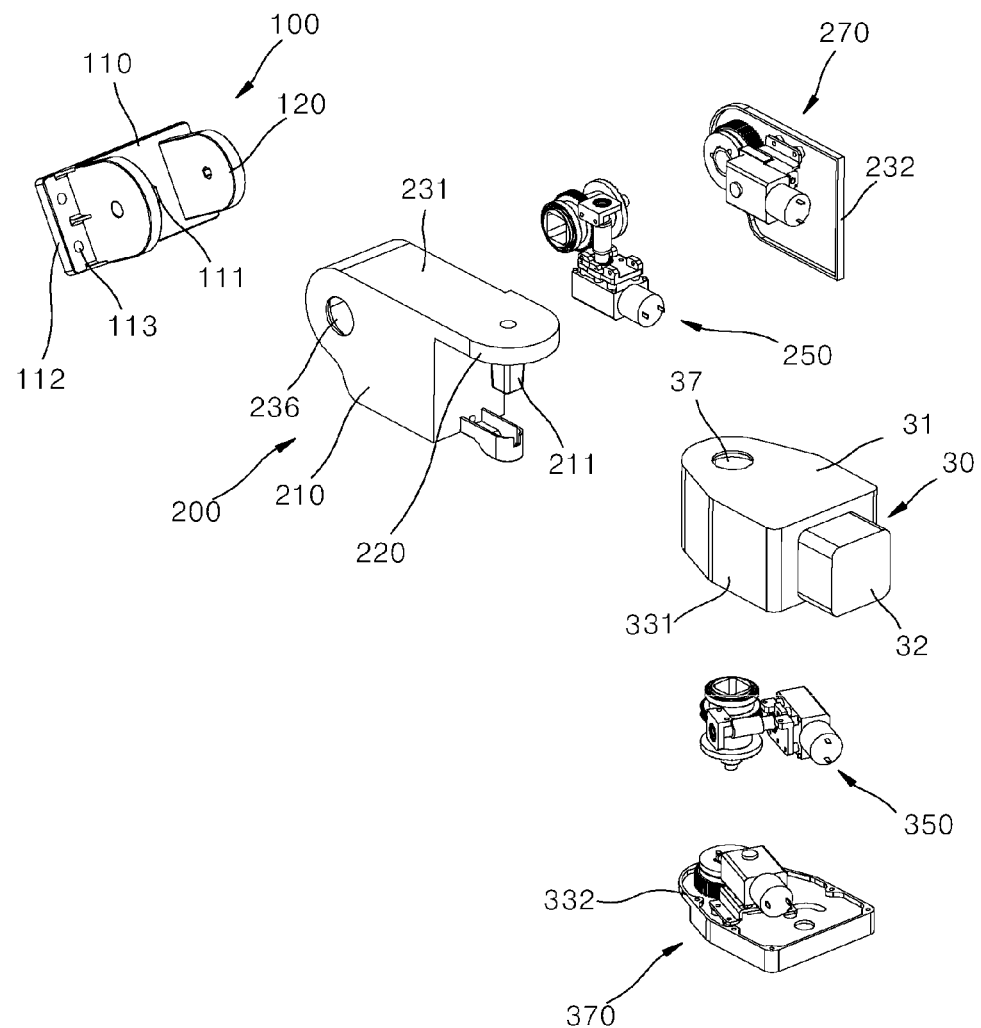
FIG. 3 is an exploded perspective view illustrating configurations of a rotation adjustment unit and a vibration prevention unit among the components illustrated in FIG. 2.
Figure 4:
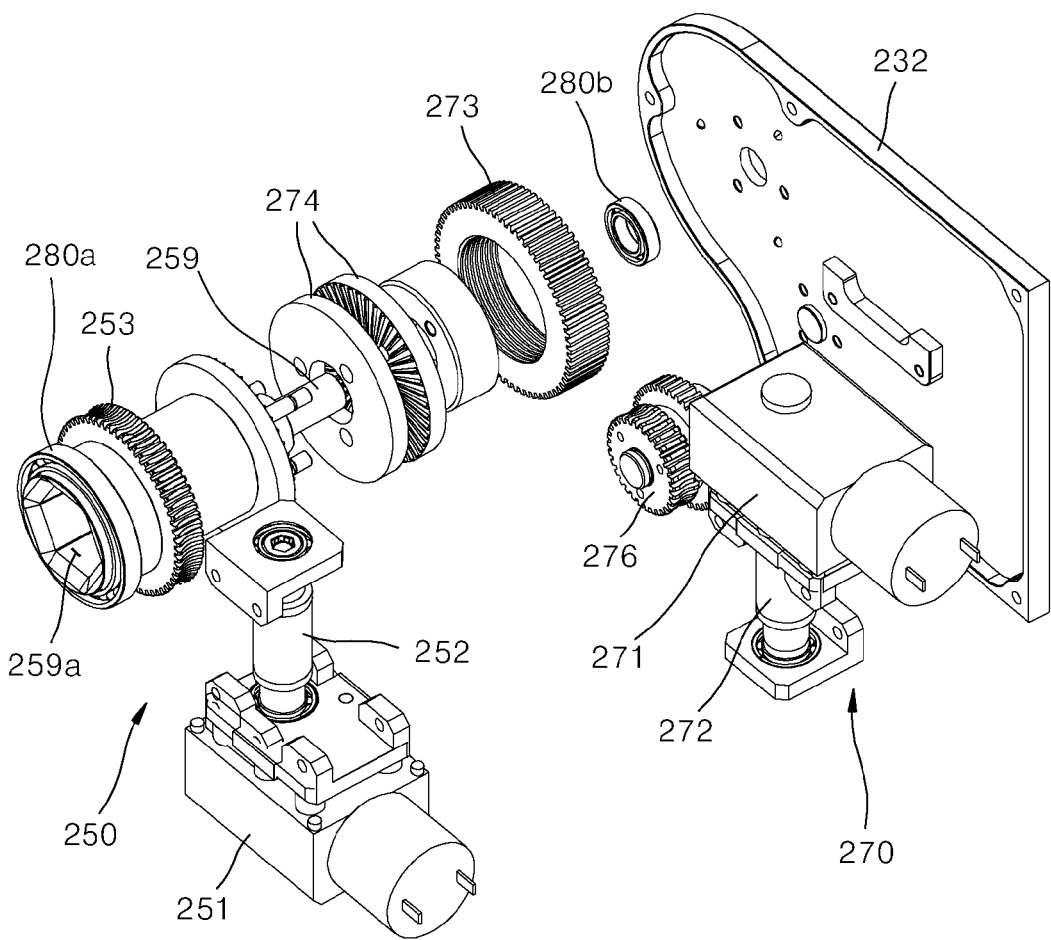
FIG. 4 is an exploded perspective view illustrating a tilting rotation adjustment unit and a tilting vibration prevention unit among the components illustrated in FIG. 3.
Figure 5:
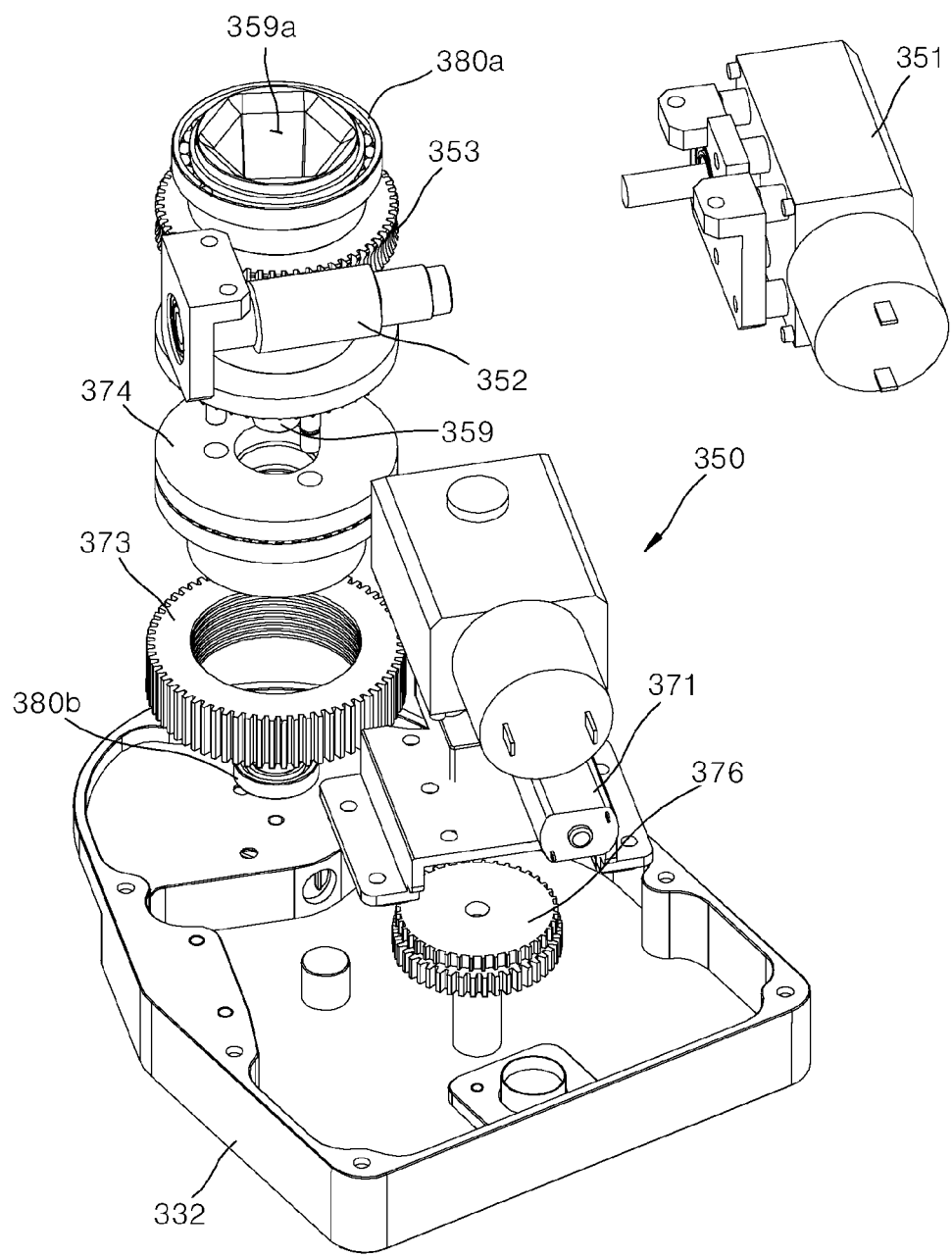
FIG. 5 is an exploded perspective view illustrating a rotating rotation adjustment unit and a rotating vibration prevention unit among the components illustrated in FIG. 3.

FIG. 1 is a perspective view illustrating a state in which an antenna clamping device according to an embodiment of the present invention is installed on a support pole, FIG. 2 is a perspective view illustrating the antenna clamping device according to the embodiment of the present invention, FIG. 3 is an exploded perspective view illustrating configurations of a rotation adjustment unit and a vibration prevention unit among the components illustrated in FIG. 2, FIG. 4 is an exploded perspective view illustrating a tilting rotation adjustment unit and a tilting vibration prevention unit among the components illustrated in FIG. 3, and FIG. 5 is an exploded perspective view illustrating a rotating rotation adjustment unit and a rotating vibration prevention unit among the components illustrated in FIG. 3.

First, an antenna clamping device according to an embodiment of the present invention will be described below.

Referring to FIGS. 1 to 5, an antenna clamping device 10 according to an embodiment of the present invention may include a rotation drive unit 30, a tilting drive unit 200, and a tilting unit 100. The rotation drive unit 30 may be coupled to a tip portion of an arm unit 500 coupled to a support pole 1. The tilting drive unit 200 may be coupled to the rotation drive unit 30 so as to be rotatable in a horizontal direction. The tilting unit 100 may be coupled to the tilting drive unit 200 so as to be rotatable in a vertical direction. In this case, the rotation in the horizontal direction may be identical to a rotating rotation, and the rotation in the vertical direction may be identical to a tilting rotation. That is, the rotation in the horizontal direction and the rotating rotation may mean a rotation about a vertical axis as a rotation center. In addition, the rotation in the vertical direction and the tilting rotation may mean a rotation about a horizontal axis as a rotation center.

Referring to FIG. 1, the arm unit 500 may extend by a predetermined length toward one side of the support pole 1 based on the horizontal direction which is disposed vertically in the vertical direction. The arm unit 500 may serve to mediate the coupling between the rotation drive unit 30 and the support pole 1.

In more detail, the arm unit 500 may include an arm main body 510, a stationary bracket 520, and a separable bracket 530. The arm main body 510 may extend in the horizontal direction. Assuming that one of two opposite ends of the arm main body 510, which is distant from the support pole 1, is one end and the other of the two opposite ends of the arm main body 510, which is close to the support pole 1, is the other end, the stationary bracket 520 may be integrally provided at the other end of the arm main body 510 and disposed at one side of an outer peripheral surface of the support pole 1. The separable bracket 530 may be provided separately from the arm main body 510 and disposed at the other side of the outer peripheral surface of the support pole 1. The separable bracket 530 may be coupled to the stationary bracket 520 by a plurality of long fixing bolts 540 and a plurality of fixing nuts 550.

The arm main body 510 and the stationary bracket 520 may be coupled to each other by welding. To ensure rigidity that may withstand overall weights of the clamping device 10 and an antenna A coupled to a tip of the tilting unit 100, a plurality of rigidity ribs 560 may be coupled, by welding, to a coupling portion between the arm main body 510 and the stationary bracket 520 and spaced apart from one another at predetermined distances along a rim of the arm main body 510.

The antenna clamping device 10 according to the embodiment of the present invention may be installed at the tip portion of the arm unit 500.

The antenna clamping device 10 serves to mediate the installation of the antenna A on the arm unit 500 and is configured to be rotated or tilted to set a direction of the antenna A. The antenna clamping device 10 may be a component collectively defined by the tilting unit 100, the tilting drive unit 200, and the rotation drive unit 30.

Further, according to the antenna clamping device 10 in this case, the tilting rotation and the rotating rotation of the tilting unit 100 and the tilting drive unit 200 may be automatically implemented by motors (rotation motors 251 and 351 and rotation prevention motors 271 and 371 to be described below) that operate electrically.

The tilting unit 100 may include an antenna coupling block 110 and a pair of tilting coupling panels 120. The antenna coupling block 110 is a part on which the antenna A is substantially fixedly mounted. The antenna coupling block 110 may have a quadrangular panel shape having a flat vertical surface. Bolt flanges 112 may be provided at two opposite sides of the antenna coupling block 110 and protrude and extend outward by a predetermined length. In this case, bolting fastening holes 113, which penetrate the bolt flanges 112 in a forward/rearward direction, are respectively provided in the bolt flanges 112. The antenna A may be securely fixed to the antenna coupling block 110 by non-illustrated fixing bolts (or fixing screws) respectively fastened through the bolting fastening holes 113. That is, the bolt flanges 112 having the bolting fastening holes 113, to which the antenna A is coupled by bolting, are respectively provided at the two opposite sides of the antenna coupling block 110, such that the antenna A may be coupled, by bolting, to front ends of the two opposite bolt flanges 112. The pair of tilting coupling panels 120 may extend rearward from a rear surface of the antenna coupling block 110.

The antenna coupling block 110 and the pair of tilting coupling panels 120 are just described as being separated for the convenience of description. The antenna coupling block 110 and the pair of tilting coupling panels 120 of the tilting unit 100 may be integrally formed.

A tilting shaft coupling protrusion 111 may be provided in an inner surface of any one of the pair of tilting coupling panels 120 and inserted into and coupled to a tilting shaft hole 236 which is provided in the tilting drive unit 200 and will be described below. The tilting shaft coupling protrusion 111 may be a center of the vertical rotation of the tilting unit 100. The tilting shaft coupling protrusion 111 may be inserted into and fixed to a tilting shaft coupling protrusion insertion hole 259a formed in a tilting shaft 259 to be described below among the components of a tilting rotation adjustment unit 250.

The tilting shaft coupling protrusion 111 may have a rod shape having an approximately pentagonal or hexagonal vertical cross-section. Further, the tilting shaft coupling protrusion insertion hole 259a formed in the tilting shaft 259 may have a groove shape by which the tilting shaft coupling protrusion 111 may be caught so that the tilting shaft coupling protrusion 111 rotates in conjunction with the tilting shaft 259 when the tilting shaft 259 rotates in a tilting rotation direction.

Referring to FIG. 3, the tilting drive unit 200 may include a tilting support block 210 and a rotating coupling panel 220. The tilting shaft hole 236 may be formed in the tilting support block 210, and the tilting shaft coupling protrusion 111 of the tilting coupling panel 120 may be inserted into and coupled to the tilting shaft hole 236. The tilting support block 210 may support inner surfaces of the tilting coupling panels 120 so that the tilting coupling panels 120 are rotatable. The rotating coupling panel 220 may extend rearward from an upper side of the tilting support block 210. The rotating coupling panel 220 may be coupled to the rotation drive unit 30 so as to perform the rotating rotation.

The tilting support block 210 and the rotating coupling panel 220 may be integrated. An installation space may be formed in the tilting support block 210. The tilting rotation adjustment unit 250, which is the component related to the tilting rotation of the rotation adjustment units 250 and 350 to be described below, may be installed in the installation space. A tilting vibration prevention unit 270 of vibration prevention units 270 and 370 to be described below may be installed in the installation space.

In more detail, the tilting support block 210 may include a rotating housing 231 and a rotating cover housing 232. The installation space, which is opened at one side thereof, may be formed in the rotating housing 231, and the rotating coupling panel 220 may be formed on the rotating housing 231. The rotating cover housing 232 may be coupled to the opened one side of the rotating housing 231 and shield the installation space formed in the rotating housing 231.

The rotating coupling panel 220 may be coupled to the rotation drive unit 30 so that a lower surface of the rotating coupling panel 220 is in surface contact with an upper surface of the rotation drive unit 30. A rotating shaft coupling protrusion 211 may extend by a predetermined length downward toward the rotation drive unit 30 from the lower surface of the rotating coupling panel 220. A rotating shaft hole 37 may be formed in the rotation drive unit 30, and the rotating shaft coupling protrusion 211 may penetrate the rotating shaft hole 37. The rotating shaft coupling protrusion 211 may be connected to the rotating rotation adjustment unit 350 of the rotation adjustment units 250 and 350 to be described below.

Further, the rotation drive unit 30 may include a rotating support block 31 and an arm fastening block 32. The rotating coupling panel 220 may be fastened to and in surface contact with the rotating support block 31 so as to be rotatable in the horizontal direction. The arm fastening block 32 may extend rearward from a rear surface of the rotating support block 31 and be coupled to the tip portion of the arm unit 500.

The rotating support block 31 and the arm fastening block 32 may be integrated. An installation space may be formed in the rotating support block 31. The rotating rotation adjustment unit 350, which is the component related to the rotating rotation of the rotation adjustment units 250 and 350 to be described below, may be installed in the installation space. The rotating vibration prevention unit 370 of the vibration prevention units 270 and 370 to be described below may be installed in the installation space.

In more detail, the rotating support block 31 may include a coupling housing 331 and a coupling cover housing 332. The installation space, which is opened at a lower side thereof, may be formed in the coupling housing 331, and the arm fastening block 32 may be formed on the coupling housing 331. The coupling cover housing 332 may be coupled to the opened lower side of the coupling housing 331 and shield the installation space formed in the coupling housing 331.

As described above, according to the antenna clamping device 10 according to the embodiment of the present invention, the tilting drive unit 200 is coupled to the rotation drive unit 30 so as to be rotatable in the horizontal direction about the rotating shaft coupling protrusion 211, such that the antenna A may be rotated in the horizontal direction. Further, the tilting unit 100 is coupled to the tilting drive unit 200 so as to be rotatable in the vertical direction about the tilting shaft coupling protrusion 111, such that the antenna A may be rotated in the horizontal and vertical directions, and the direction of the antenna A may be adjusted.

Referring to FIG. 3, the antenna clamping device 10 according to the embodiment of the present invention may include the rotation adjustment units 250 and 350 installed in the installation space of the tilting support block 210 of the tilting drive unit 200 so as to manipulate the tilting rotation of the tilting unit 100 or installed in the installation space of the rotating support block 31 of the rotation drive unit 30 so as to manipulate the rotating rotation of the tilting drive unit 200.

Figure 6A:
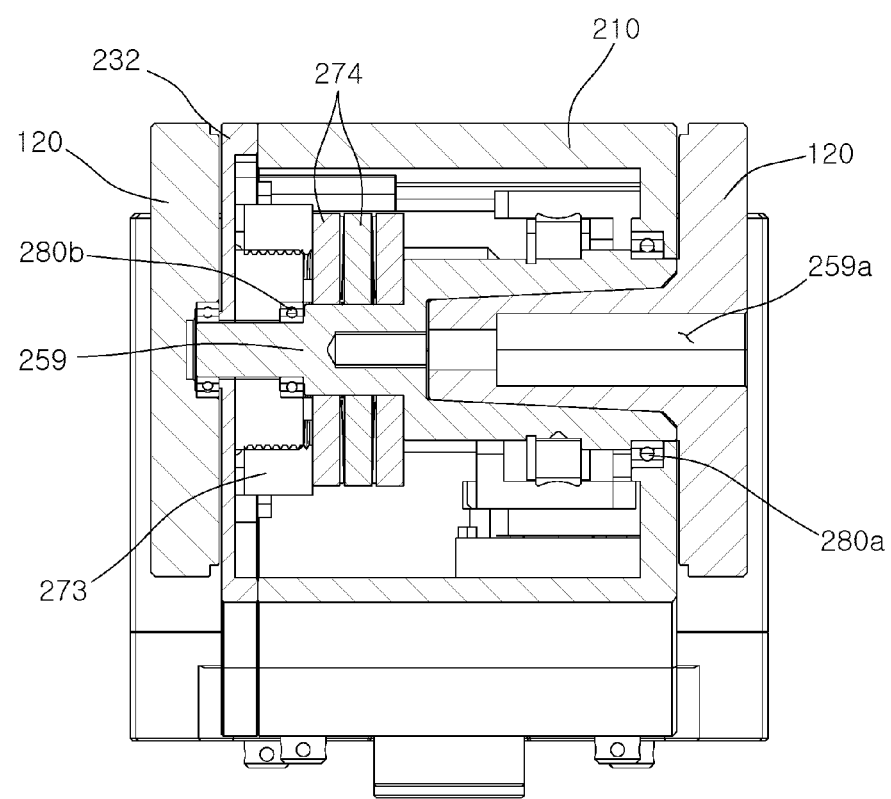
FIGS. 6A and 6B are a cross-sectional view and a cut-away perspective view taken along line A-A in FIG. 1.
Figure 6B:
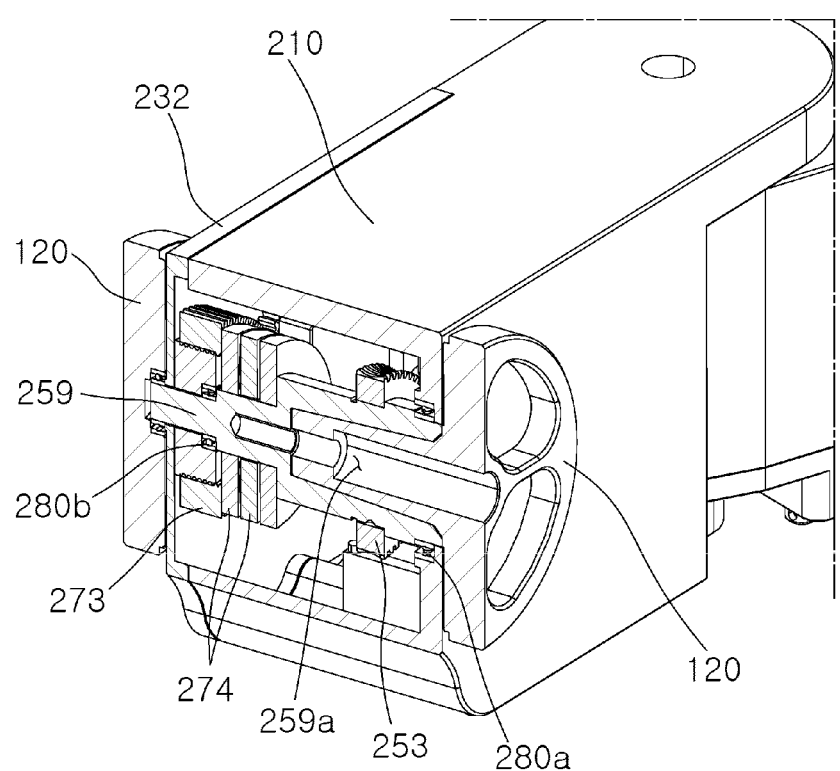
Figure 7A:
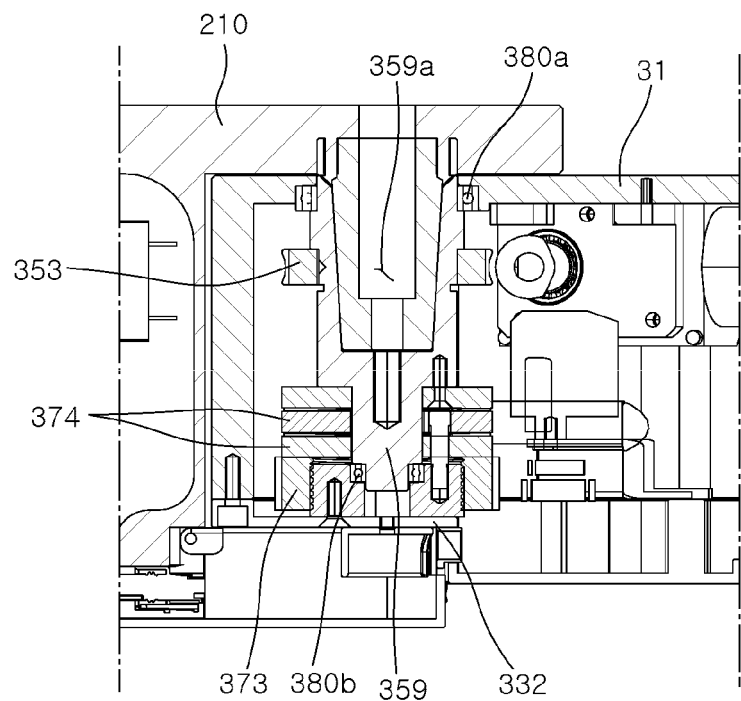
FIGS. 7A and 7B are a cross-sectional view and a cut-away perspective view taken along line B-B in FIG. 1.
Figure 7B:
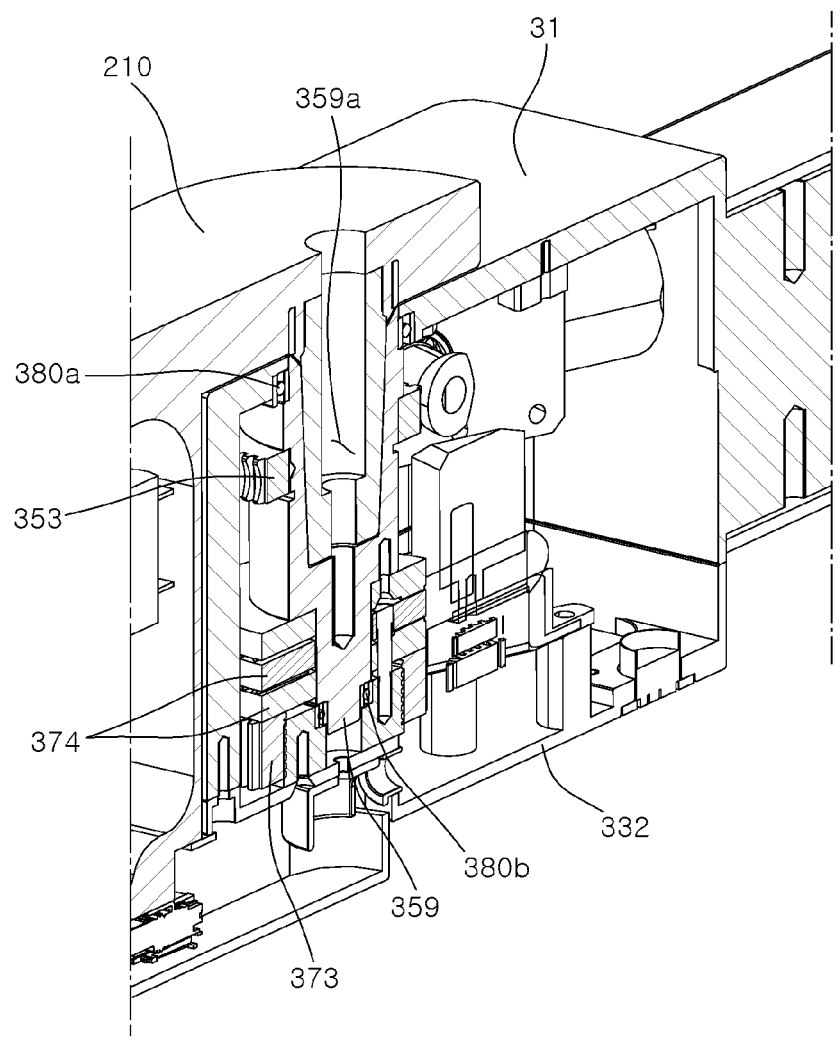

FIGS. 6A and 6B are a cross-sectional view and a cut-away perspective view taken along line A-A in FIG. 1, and FIGS. 7A and 7B are a cross-sectional view and a cut-away perspective view taken along line B-B in FIG. 1.

Referring to FIGS. 3 to 7B, the rotation adjustment units 250 and 350 may include the tilting rotation adjustment unit 250 disposed in the tilting drive unit 200, and the rotating rotation adjustment unit 350 disposed in the rotating drive unit 30. Both the rotation adjustment units 250 and 350 may be automatically operated by the rotation motors 251 and 351 that operate electrically. Hereinafter, for understanding of the description, the rotation motor 251 of the tilting rotation adjustment unit 250 is referred to as a tilting rotation motor 251, and the rotation motor 351 of the rotating rotation adjustment unit 350 is referred to as a rotating rotation motor 351.

Further, the antenna clamping device 10 may further include the vibration prevention units 270 and 370. The vibration prevention units 270 and 370 may be respectively provided in the tilting drive unit 200 and the rotating drive unit 30. The vibration prevention units 270 and 370 may prevent a change in angle due to vibration or impact caused by an external force (or an external environment). In this case, both the vibration prevention units 270 and 370 may be automatically operated by the rotation prevention motors 271 and 371 that operate electrically.

Hereinafter, the configurations of the rotation adjustment units 250 and 350 and the vibration prevention units 270 and 370 will be described in more detail.

Referring to FIGS. 4, 6A, and 6B, the tilting rotation adjustment unit 250 of the rotation adjustment units 250 and 350 may include the tilting rotation motor 251 configured to operate electrically, a tilting worm gear 252 configured to be axially rotated by the tilting rotation motor 251, a tilting worm wheel gear 253 configured to engage with the tilting worm gear 252, and a tilting shaft 259 integrated with the tilting worm wheel gear 253 on the tilting shaft 259.

In this case, the tilting shaft coupling protrusion insertion hole 259a may be formed at a tip of the tilting shaft 259, and the tilting shaft coupling protrusion 111 of the tilting unit 100 may be inserted into and coupled to the tilting shaft coupling protrusion insertion hole 259a. The tilting shaft coupling protrusion 111 may penetrate the tilting shaft hole 236 formed in the rotating housing 231 and enter the inside of the rotating housing 231. Then, the tilting shaft coupling protrusion 111 may be inserted into the tilting shaft coupling protrusion insertion hole 259a and coupled to the tilting shaft 259. The tilting shaft coupling protrusion 111 may be coupled to and press-fitted into the tilting shaft coupling protrusion insertion hole 259a and rotate in conjunction with the tilting shaft 259. As described above, the tilting shaft coupling protrusion insertion hole 259a corresponds to a vertical cross-sectional shape of the tilting shaft coupling protrusion 111. Therefore, when the tilting shaft 259 axially rotates, the tilting shaft coupling protrusion 111 rotates in conjunction with the tilting shaft 259, and the tilting unit 100 integrated with the tilting shaft coupling protrusion 111 rotates, thereby tilting the antenna A.

Further, the tilting rotation adjustment unit 250 may further include one support bearing 280a and the other support bearing 280b configured to respectively support one end and the other end of the tilting shaft 259 to support a rotation of the tilting shaft 259. One support bearing 280a and the other support bearing 280b are disposed in the rotating housing 231 and serve to support the rotation of the tilting shaft 259.

The tilting rotation adjustment unit 250 may rotate the tilting unit 100 in the vertical direction by automatically rotating the tilting shaft coupling protrusion 111 connected to the tilting shaft 259 by rotating the tilting shaft 259 by rotating the tilting worm gear 252 and the tilting worm wheel gear 253 in the direction in which the tilting rotation motor 251 rotates.

Meanwhile, referring to FIGS. 5, 7A, and 7B, the rotating rotation adjustment unit 350 of the rotation adjustment units 250 and 350 may include the rotating rotation motor 351, a rotating worm gear 352 configured to be axially rotated by the rotating rotation motor 351, a rotating worm wheel gear 353 configured to engage with the rotating worm gear 352, and a rotating shaft 359 integrated with the rotating worm wheel gear 353 on the rotating shaft 359.

In this case, a rotating shaft coupling protrusion insertion hole 359a may be formed at a tip of the rotating shaft 359, and the rotating shaft coupling protrusion 211 of the tilting drive unit 200 may be inserted into and coupled to the rotating shaft coupling protrusion insertion hole 359a. The rotating shaft coupling protrusion 211 may penetrate the rotating shaft hole 37 formed in the coupling housing 331 of the rotation drive unit 30 and enter the inside of the coupling housing 331. Then, the rotating shaft coupling protrusion 211 may be inserted into the rotating shaft coupling protrusion insertion hole 359a and coupled to the rotating shaft 359. The rotating shaft coupling protrusion 211 may be coupled and press-fitted into the rotating shaft coupling protrusion insertion hole 359a and rotate in conjunction with the rotating shaft 359.

Like the tilting shaft coupling protrusion 111, the rotating shaft coupling protrusion 211 may have a rod shape having an approximately pentagonal or hexagonal vertical cross-section. Further, the rotating shaft coupling protrusion insertion hole 359a formed in the rotating shaft 359 may have a groove shape by which the rotating shaft coupling protrusion 211 is caught so that the rotating shaft coupling protrusion 211 rotates in conjunction with the rotating shaft 359 when the rotating shaft 359 rotates in a rotating rotation direction.

Further, the rotating rotation adjustment unit 350 may further include one support bearing 380a and the other support bearing 380b configured to respectively support one end and the other end of the rotating shaft 359 to support a rotation of the rotating shaft 359. One support bearing 380a and the other support bearing 380b are disposed in the coupling housing 331 and serve to support the rotation of the rotating shaft 359.

The rotating rotation adjustment unit 350 may rotate the tilting drive unit 200 in the horizontal direction by automatically rotating the rotating shaft coupling protrusion 211 connected to the rotating shaft 359 by rotating the rotating shaft 359 by rotating the rotating worm gear 352 and the rotating worm wheel gear 353 in the direction in which the rotating rotation motor 351 rotates.

Meanwhile, referring to FIGS. 4, 6A, and 6B, the tilting vibration prevention unit 270 of the vibration prevention units 270 and 370 may include a pair of tilting brake pads 274 coupled to an outer peripheral surface of the tilting shaft 259, and a tilting rotation prevention gear 273 configured to allow the pair of tilting brake pads 274 to be in close contact with or spaced apart from each other.

In this case, any one of the pair of tilting brake pads 274 may rotate in conjunction with the tilting shaft 259, and the other of the pair of tilting brake pads 274 may be moved in an axial direction of the tilting shaft 259 by the rotation of the tilting rotation prevention gear 273 separated from the tilting shaft 259.

In more detail, the tilting rotation prevention gear 273 has a ring shape. An internal thread is formed on an inner peripheral surface of the tilting rotation prevention gear 273, and an external thread is formed on an outer peripheral surface of a body portion of the other of the pair of tilting brake pads 274 and fastened to the internal thread of the tilting rotation prevention gear 273, such that the outer peripheral surface of the body portion may be screw-fastened to the inner peripheral surface of the tilting rotation prevention gear 273.

Therefore, when the tilting rotation prevention gear 273 is rotated in place by the tilting rotation prevention motor 271 to be described below, the body portion of the other of the pair of tilting brake pads 274 rectilinearly moves in the axial direction, such that the pair of tilting brake pads 274 may become in close contact with or spaced apart from each other.

Further, the tilting rotation prevention gear 273 may be electrically operated by the tilting rotation prevention motor 271 provided in the tilting drive unit 200.

Driving power of the tilting rotation prevention motor 271 may be transmitted to the tilting rotation prevention gear 273 through the tilting vibration prevention worm gear 272 and the tilting vibration prevention intermediate gear 276.

When the tilting rotation prevention motor 271 rotates in one direction (hereinafter, referred to as a 'locking direction'), the tilting rotation prevention gear 273 may be rotated in the locking direction by the rotation of the tilting vibration prevention worm gear 272 in one direction and the rotation of the tilting vibration prevention intermediate gear 276 in one direction and allow the pair of tilting brake pads 274 to be in close contact with each other, thereby preventing the tilting shaft 259 from arbitrarily rotating.

On the contrary, when the tilting rotation prevention motor 271 rotates in the other direction (hereinafter, referred to as an 'unlocking direction'), the tilting rotation prevention gear 273 may be rotated in the unlocking direction by the rotation of the tilting vibration prevention worm gear 272 in the other direction and the rotation of the tilting vibration prevention intermediate gear 276 in the other direction, and the pair of tilting brake pads 274, which is in close contact with each other, may move away from each other and switch to a state in which the tilting shaft 259 is rotatable.

Meanwhile, referring to FIGS. 5, 7A, and 7B, the rotating vibration prevention unit 370 of the vibration prevention units 270 and 370 may include a pair of rotating brake pads 374 coupled to an outer peripheral surface of the rotating shaft 359, and a rotating rotation prevention gear 373 configured to allow the pair of rotating brake pads 374 to be in close contact with or spaced apart from each other.

In this case, any one of the pair of rotating brake pads 374 may rotate in conjunction with the rotating shaft 359, and the other of the pair of rotating brake pads 374 may be moved in an axial direction of the rotating shaft 359 by the rotation of the rotating rotation prevention gear 373 separated from the rotating shaft 359.

In more detail, the rotating rotation prevention gear 373 has a ring shape. An internal thread is formed on an inner peripheral surface of the rotating rotation prevention gear 373, and an external thread is formed on an outer peripheral surface of a body portion of the other of the pair of rotating brake pads 374 and fastened to the internal thread of the rotating rotation prevention gear 373, such that the body portion may be screw-fastened to the inside of the rotating rotation prevention gear 373.

Therefore, when the rotating rotation prevention gear 373 is rotated in place by the rotating rotation prevention motor 371 to be described below, the body portion of the other of the pair of rotating brake pads 374 rectilinearly moves in the axial direction, such that the pair of rotating brake pads 374 may become in close contact with or spaced apart from each other.

Further, the rotating rotation prevention gear 373 may be electrically operated by the rotating rotation prevention motor 371 provided in the rotation drive unit 30.

Driving power of the rotating rotation prevention motor 371 may be transmitted to the rotating rotation prevention gear 373 through a rotating vibration prevention worm gear 372 and a rotating vibration prevention intermediate gear 376.

When the rotating rotation prevention motor 371 rotates in one direction (hereinafter, referred to as a 'locking direction'), the rotating rotation prevention gear 373 may be rotated in the locking direction by the rotation of the rotating vibration prevention worm gear 372 in one direction and the rotation of the rotating vibration prevention intermediate gear 376 in one direction and allow the pair of rotating brake pads 374 to be in close contact with each other, thereby preventing the rotating shaft 359 from arbitrarily rotating.

On the contrary, when the rotating rotation prevention motor 371 rotates in the other direction (hereinafter, referred to as an 'unlocking direction'), the rotating rotation prevention gear 373 may be rotated in the unlocking direction by the rotation of the rotating vibration prevention worm gear 372 in the other direction and the rotation of the rotating vibration prevention intermediate gear 376 in the other direction, and the pair of rotating brake pads 374, which is in close contact with each other, may move away from each other and switch to a state in which the rotating shaft 359 is rotatable.

As described above, the vibration prevention units 270 and 370 prevent the arbitrary rotations of the tilting shaft 259 and the rotating shaft 359 by using a frictional force between the pair of tilting brake pads 274 in the case of the tilting unit 100 or using a frictional force between the pair of rotating brake pads 374 in the case of the tilting drive unit 200. Therefore, it is possible to prevent the tilting unit 100 and the tilting drive unit 200 from being arbitrarily rotated by fine vibration due to an external environment and prevent a preset direction of the antenna A from being arbitrarily changed.

Meanwhile, although not illustrated in the drawings, a tilting detection unit configured to detect the amount of tilting rotation of the tilting unit 100 and a tilting pressure detection unit configured to detect a tilting pressure transmitted through the tilting unit 100 may be provided in the rotating housing 231 of the tilting drive unit 200. A rotating detection unit configured to detect the amount of rotating rotation of the tilting drive unit 200 and a rotating pressure detection unit configured to detect a rotating pressure transmitted through the tilting drive unit 200 may be provided in the coupling housing 331 of the rotation drive unit 30.

In this case, the amount of tilting rotation detected by the tilting detection unit may be a rotation angle of a rotary shaft of the tilting rotation motor 251, and the amount of rotating rotation detected by the rotating detection unit may be a rotation angle of a rotary shaft of the rotating rotation motor 351. The tilting pressure detected by the tilting pressure detection unit may be a close-contact force (frictional force) between the pair of tilting brake pads 274, and the rotating pressure detected by the rotating pressure detection unit may be a close-contact force (frictional force) between the pair of rotating brake pads 374.

In addition, although not illustrated in the drawings, an image detection unit may be further provided. The image detection unit may be provided on an outer surface of the antenna clamping device 10 or installed at a position at which the image detection unit may capture the antenna A or a rotating state of the antenna A from the outside. The image detection unit may detect image data or video data indicating states before and after the antenna A is rotated by the antenna clamping device 10. As an example, the image detection unit may be a camera and output image data or video data captured in real time through a display unit. In this case, the display unit may be provided on the image detection unit such as the camera or configured as a separate display unit to be described below. The display unit may output the rotating state of the antenna A as a still cut image or output image data or video data indicating the states before and after the antenna A rotates.

Hereinafter, the tilting detection unit, the rotating detection unit, the tilting pressure detection unit, the rotating pressure detection unit, and the image detection unit are collectively referred to as a 'detection unit'.

In this case, the detection units, which are configured as the tilting detection unit and the rotating detection unit, may respectively detect rotation angles of the tilting unit 100 and the tilting drive unit 200.

Further, the tilting pressure detection unit and the rotating pressure detection unit may detect pressure values produced by swaying due to external forces or external environmental factors applied from the outside in a current fixed state in which the tilting rotation and the rotating rotation are completed.

In addition, as described above, the image detection unit may capture and detect overall images indicating the states before and after the antenna A rotates.

Meanwhile, the antenna clamping device 10 according to the embodiment of the present invention may further include the display unit configured to display the detection value detected by the detection unit so that a remote control center to be described below may visually recognize the detection value.

The display unit displays, in real time, the rotating state of the antenna A captured by the detection unit, particularly, the image detection unit. The display unit may be provided on the image detection unit such as the camera as described above or separately provided on the remote control center. An operator may precisely control the rotation of the antenna A while checking, with the naked eye, the current state of the antenna A through the display unit.

Figure 8:
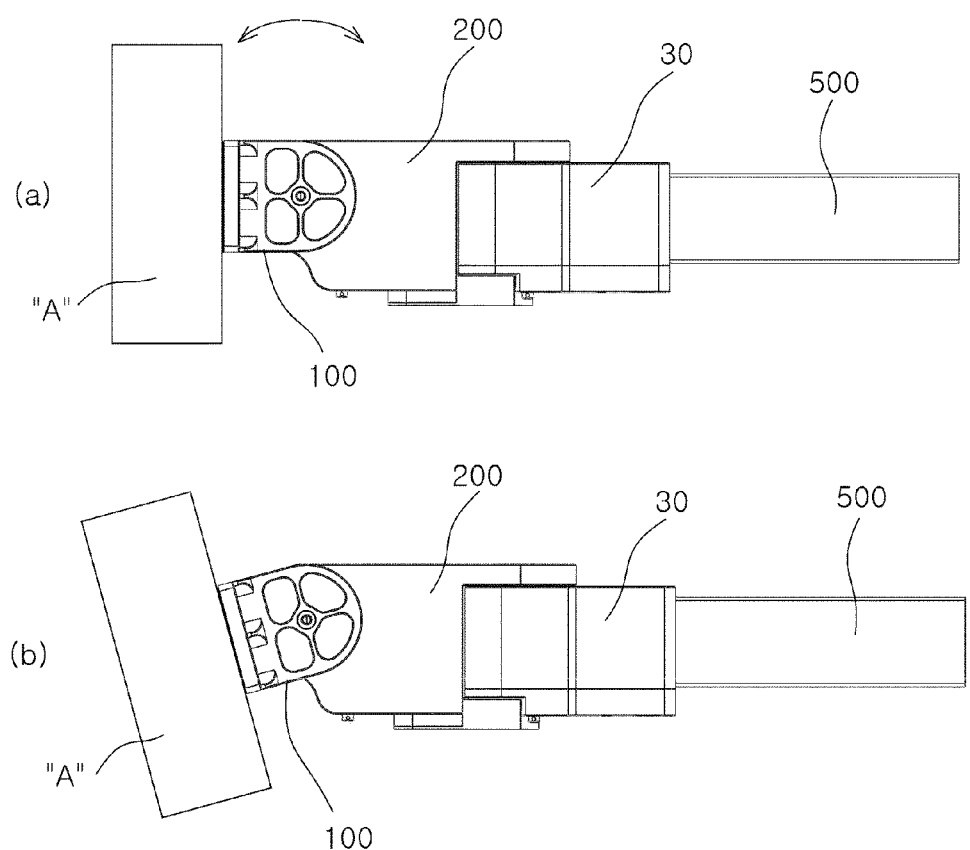
FIG. 8 is a side view illustrating states before and after an antenna is tilted by the antenna clamping device according to the embodiment of the present invention.
Figure 9:
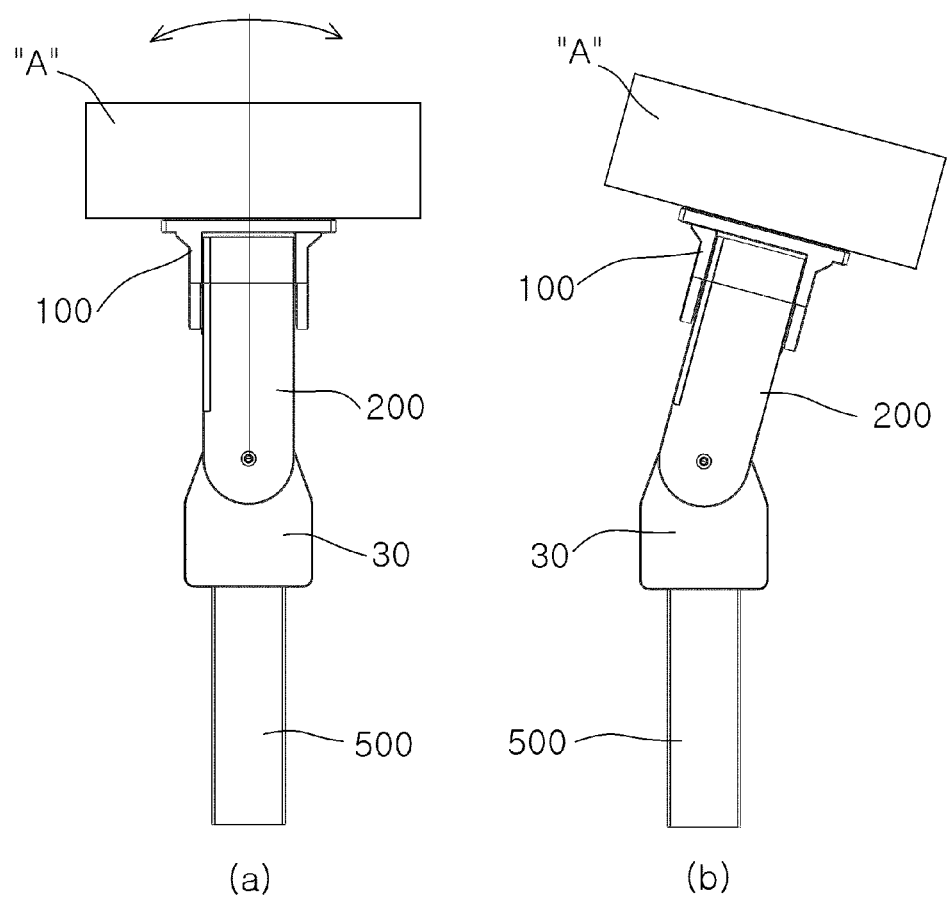
FIG. 9 is a top plan view illustrating states before and after the antenna is rotated by the antenna clamping device according to the embodiment of the present invention.

FIG. 8 is a side view illustrating states before and after the antenna is tilted by the antenna clamping device according to the embodiment of the present invention, and FIG. 9 is a top plan view illustrating states before and after the antenna is rotated by the antenna clamping device according to the embodiment of the present invention.

When the vertical rotation (tilting rotation) of the antenna A installed at the tip portion of the arm unit 500 by means of the antenna clamping device 10 according to the embodiment of the present invention is required to be adjusted, the tilting drive unit 200 may operate to rotate the tilting unit 100 in the vertical direction, as illustrated in FIGS. 8A and 8B.

Further, when the horizontal rotation (rotating rotation) of the antenna A installed at the tip portion of the arm unit 500 by means of the antenna clamping device 10 according to the embodiment of the present invention is required to be adjusted, the rotating drive unit 30 may operate to rotate the tilting drive unit 200 in the horizontal direction, as illustrated in FIGS. 9A and 9B.

In this case, the operation of the tilting drive unit 200 and the operation of the rotating drive unit 30 may be separately performed or simultaneously performed so that the direction of the antenna A may be adjusted within a short time.

As illustrated in FIGS. 8B and 9B, when the adjustment of the direction of the antenna A is completed, the tilting vibration prevention unit 270 and the rotating vibration prevention unit 370 may operate to allow the pair of tilting brake pads 274 to be in contact with each other and allow the pair of rotating brake pads 374 to be in contact with each other to prevent swaying (clearance) of the antenna A caused by fine vibration transmitted from the outside.

Figure 10A:
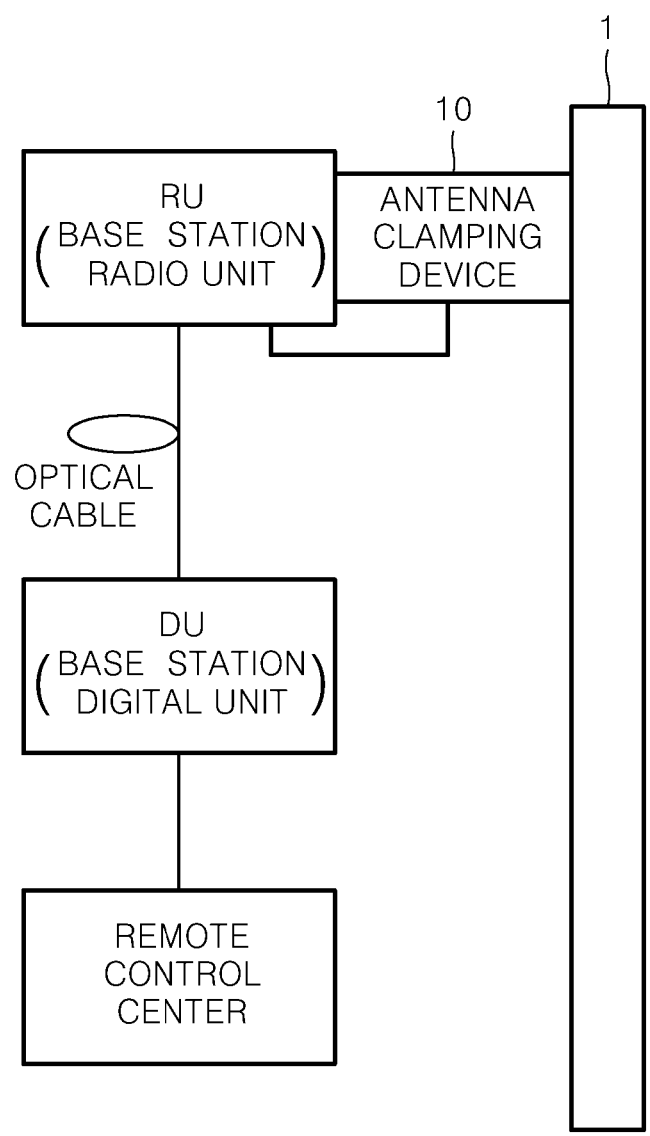
FIGS. 10A and 10B are schematic views illustrating various examples in respect to a control flow between a remote control center and a radio unit (RU).
Figure 10B:
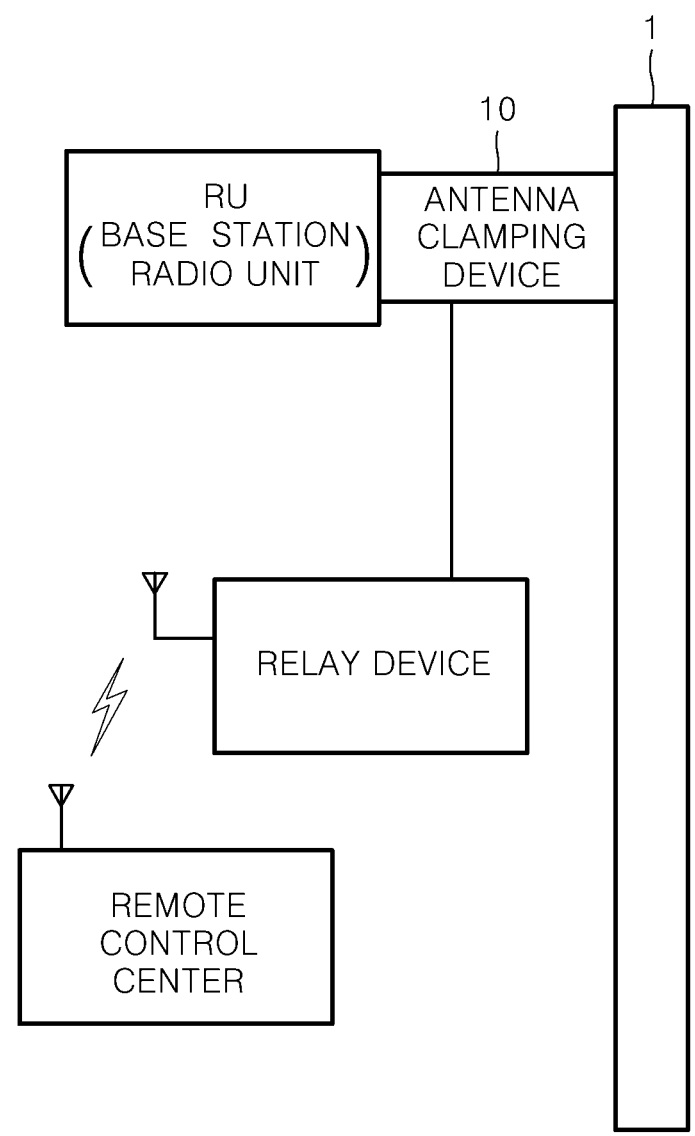
Figure 11:
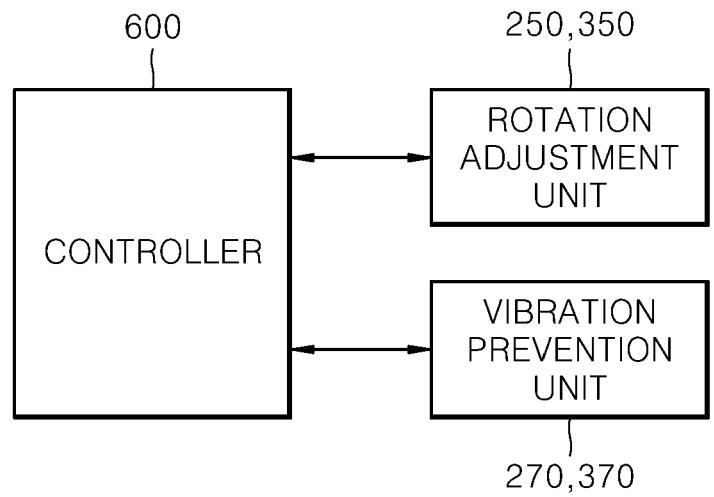
FIG. 11 is a control block diagram illustrating a relationship between a controller, the rotation adjustment unit, and the vibration prevention unit.
Figure 12:
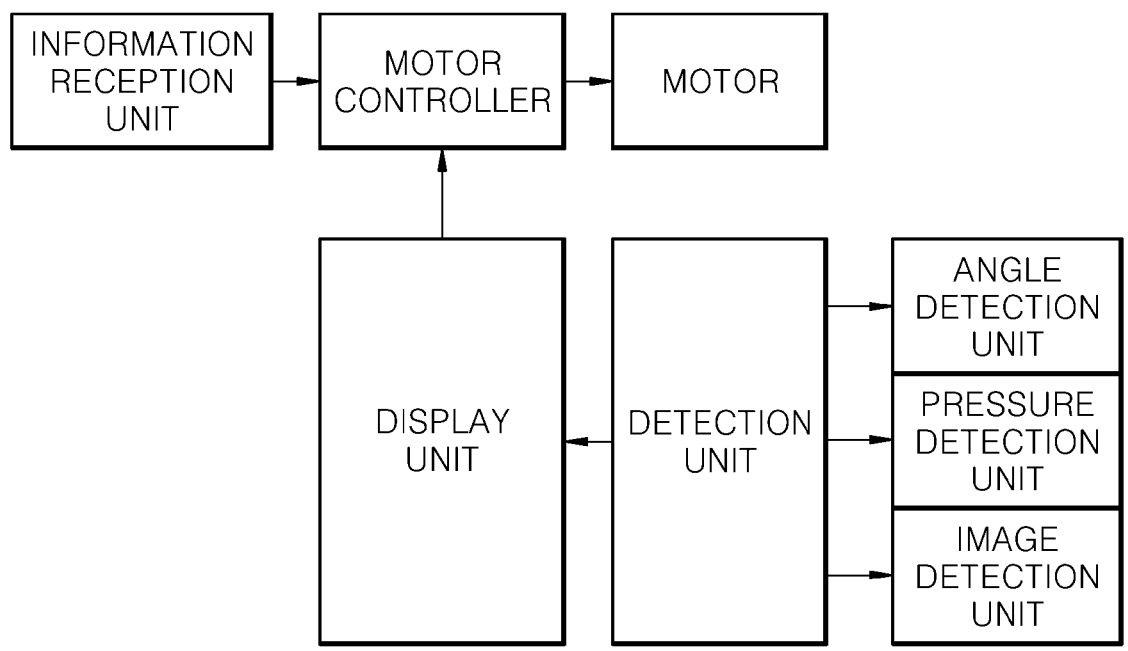
FIG. 12 is a control block diagram illustrating a control relationship in the antenna clamping device.
Figure 13:
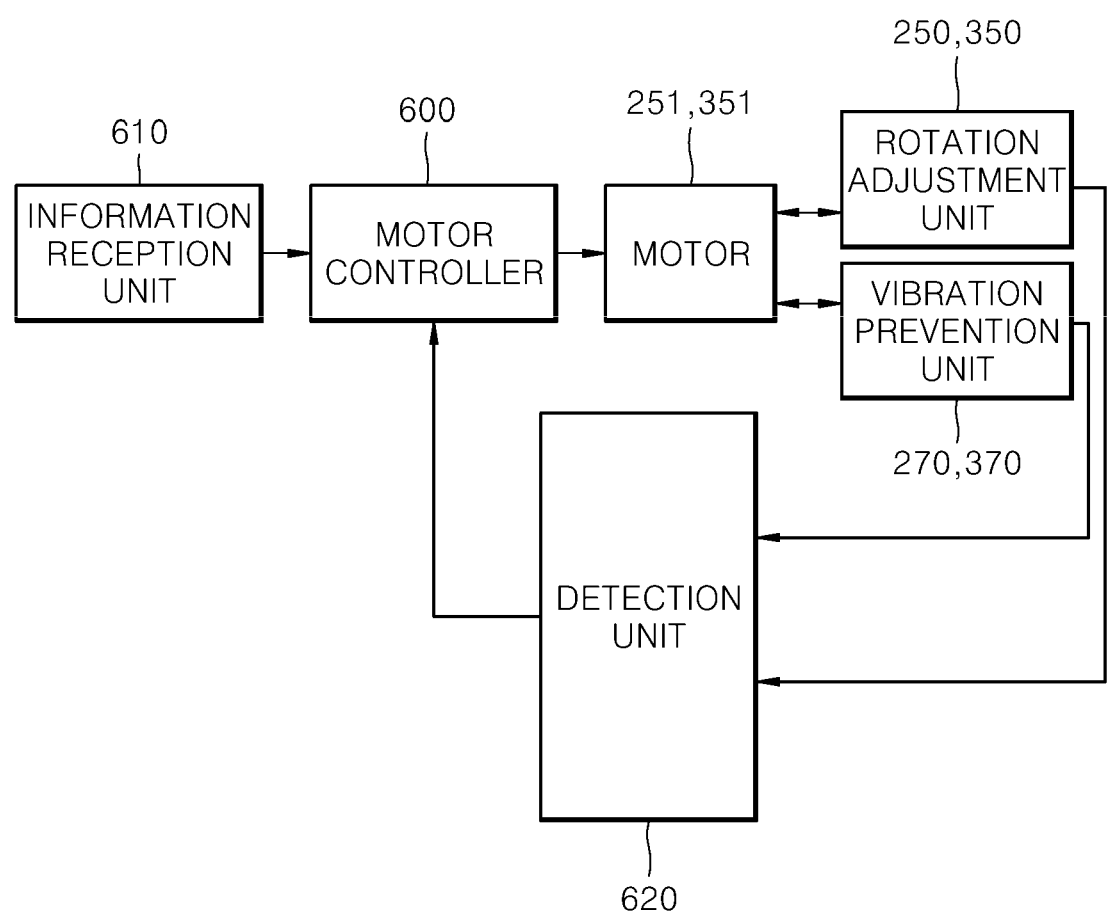
FIG. 13 is a control block diagram illustrating a specific control relationship between a motor and a detection unit.
Figure 14:
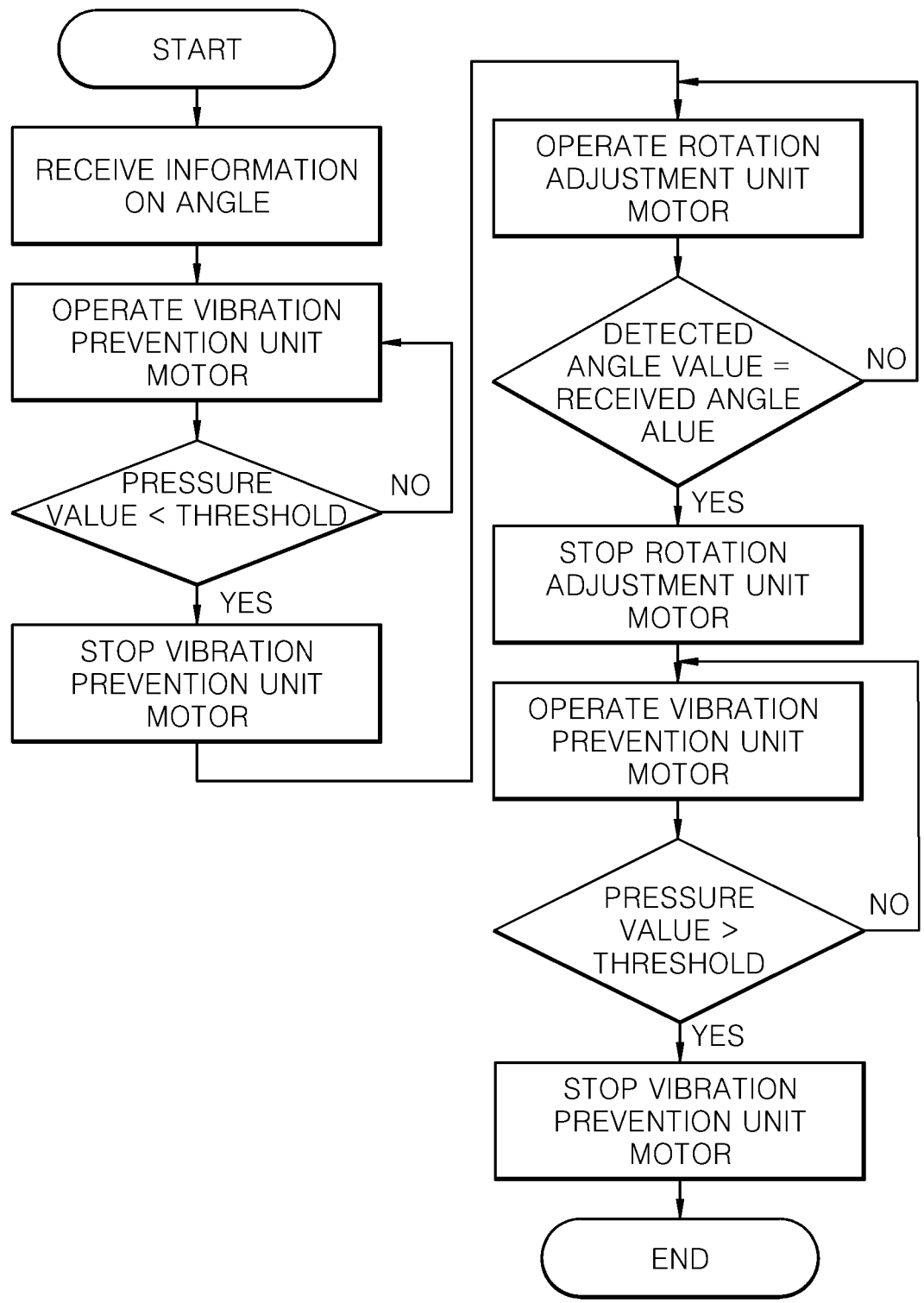
FIG. 14 is a control block diagram illustrating a method of controlling the antenna clamping device according to the embodiment of the present invention.

FIGS. 10A and 10B are schematic views illustrating various examples in respect to a control flow between a remote control center and a radio unit (RU), FIG. 11 is a control block diagram illustrating a relationship between a controller, the rotation adjustment unit, and the vibration prevention unit, FIG. 12 is a control block diagram illustrating a control relationship in the antenna clamping device, FIG. 13 is a control block diagram illustrating a specific control relationship between a motor and a detection unit, and FIG. 14 is a control block diagram illustrating a method of controlling the antenna clamping device according to the embodiment of the present invention.

Referring to FIGS. 10A and 10B, the method of controlling the antenna clamping device according to the embodiment of the present invention may be performed by the remote control center that remotely control the operations of the motors 251 and 351 of the rotation adjustment units 250 and 350 and the operations of the motors 271 and 371 of the vibration prevention units 270 and 370.

Referring to FIG. 10A, a base station in a mobile communication network is configured such that a digital unit (DU) configured to process digital signals and a radio unit (RU) configured to transmit and receive radio waves are present together. The base station is installed for each cell and transmits signals to wireless terminals carried by consumers.

The DU receives data from a non-illustrated IP network through wired communication, applies an appropriate digital signal processing process to the received data, and then transmits the data to the RU through a fronthaul section. The respective RUs, which receive data from the DU, constitute small coverage and provide data to the respective wireless terminals through wireless links.

As illustrated in FIG. 10A, the remote control center may remotely control the operations of the motors 251 and 351 of the rotation adjustment units 250 and 350 and the operations of the motors 271 and 371 of the vibration prevention units 270 and 370 through the mobile communication network.

However, the remote control center need not necessarily use the mobile communication network. As illustrated in FIG. 10B, a separate relay device may be used instead of the mobile communication network. The relay device and the remote control center are connected through wireless communication. Therefore, the operator may remotely control the operations of the motors 251 and 351 of the rotation adjustment units 250 and 350 and the operations of the motors 271 and 371 of the vibration prevention units 270 and 370 in a wireless manner by using a system terminal (not illustrated) by which the operator may operate and manage a system related to the remote control center.

Meanwhile, referring to FIG. 11, the antenna clamping device according to the embodiment of the present invention may further include a controller 600 configured to control the operations of the motors 251 and 351 of the rotation adjustment units 250 and 350 and the operations of the motors 271 and 371 of the vibration prevention units 270 and 370.

The controller 600 may adjust the tilting rotation angle of the tilting unit 100 and the rotating rotation angle of the tilting drive unit 200 by using the rotation adjustment units 250 and 350 and control the prevention of arbitrary rotation of the tilting unit 100 and the prevention of arbitrary rotation of the tilting drive unit 200 by using the vibration prevention units 270 and 370.

Further, referring to FIGS. 11 and 12, the antenna clamping device according to the embodiment of the present invention may further include an information reception unit 610. When the tilting unit 100 is tilted and the tilting drive unit 200 is rotated by the rotation adjustment units 250 and 350, the information reception unit 610 may receive information on a tilting rotation angle of the tilting unit 100 and information on a rotating rotation angle of the tilting drive unit 200 and transmit the information to the controller 600.

In this case, the controller 600 may serve as a motor controller 600 that controls the tilting rotation motor 251 configured to tilt the tilting unit 100 and the rotating rotation motor 351 configured to rotate the tilting drive unit 200.

In addition, the controller 600 may check, in real time, the current rotating state of the antenna A through the detection units including an angle detection unit, the pressure detection unit, and the image detection unit. In addition, the controller 600 may control the operation of the tilting rotation motor 251 and the operation of the rotating rotation motor 351 in a state in which visual monitoring is enabled remotely by means of the display unit of the remote control center.

Referring to FIG. 13, the controller 600 receives the information on the tilting rotation angle of the tilting unit 100 and the information on the rotating rotation angle of the tilting drive unit 200, which are based on the information on the direction of the antenna A, from the information reception unit 610. The controller 600 receives, from the detection units 620, the information on the operations and the information on the rotation angle and the pressure value transmitted from the rotation adjustment units 250 and 350 and the vibration prevention units 270 and 370. Therefore, the controller 600 may control the operations of the motors including the rotation motors 251 and 351 and the rotation prevention motors 271 and 371. In this case, the motors may be controlled on the basis of pulse width modulation (PWM) signals.

Referring to FIGS. 11 to 14, in more detail, when the controller 600 receives, from the information reception unit 610, the information on the angle of the tilting unit 100 to be operated and the information on the angle of the tilting drive unit 200 to be operated, the controller 600 operates the rotation prevention motors 271 and 371 of the vibration prevention units 270 and 370, which are currently locked by the pair of tilting brake pads 274 and the pair of rotating brake pads 374, so that the pair of brake pads 274 moves away from each other and the pair of brake pads 374 moves away from each other, thereby changing the state of the vibration prevention units 270 and 370 to the unlocked state.

In this case, the controller 600 operates the rotation prevention motors 271 and 371 of the vibration prevention units 270 and 370 until the pressure values detected by the tilting pressure detection unit and the rotating pressure detection unit among the detection units 620 become smaller than predetermined values (thresholds). When the pressure value detected by each of the tilting pressure detection unit and the rotating pressure detection unit is smaller than the predetermined value, the controller 600 may stop the operation of each of the rotation prevention motors 271 and 371.

Next, when the operations of the rotation prevention motors 271 and 371 are stopped, the controller 600 operates the rotation motors 251 and 351 of the rotation adjustment units 250 and 350 until the detected angle values detected by the detection units 620 are equal to the received angle values.

Further, when the detected angle values detected by the detection units 620 are equal to the received angle values, the controller 600 stops the operations of the rotation motors 251 and 351 of the rotation adjustment units 250 and 350 and operates the rotation prevention motors 271 and 371 of the vibration prevention units 270 and 370 again until the pressure values detected by the detection units 620 at a tilting fixing position of the tilting unit 100 and a rotating fixing position of the tilting drive unit 200 are larger than predetermined values. When the pressure values detected by the detection units 620 are larger than the predetermined values, the controller 600 stops the operations of the rotation prevention motors 271 and 371 of the vibration prevention units 270 and 370.

The states in which the rotation adjustment units 250 and 350 and the vibration prevention units 270 and 370 are controlled by the controller 600 may be recognized by the operator through the display unit provided on the remote control center or the display unit provided on the system terminal that operates in conjunction with the remote control center. Therefore, the operator may check the changed angle of the antenna A with the naked eye.

Figure 15:
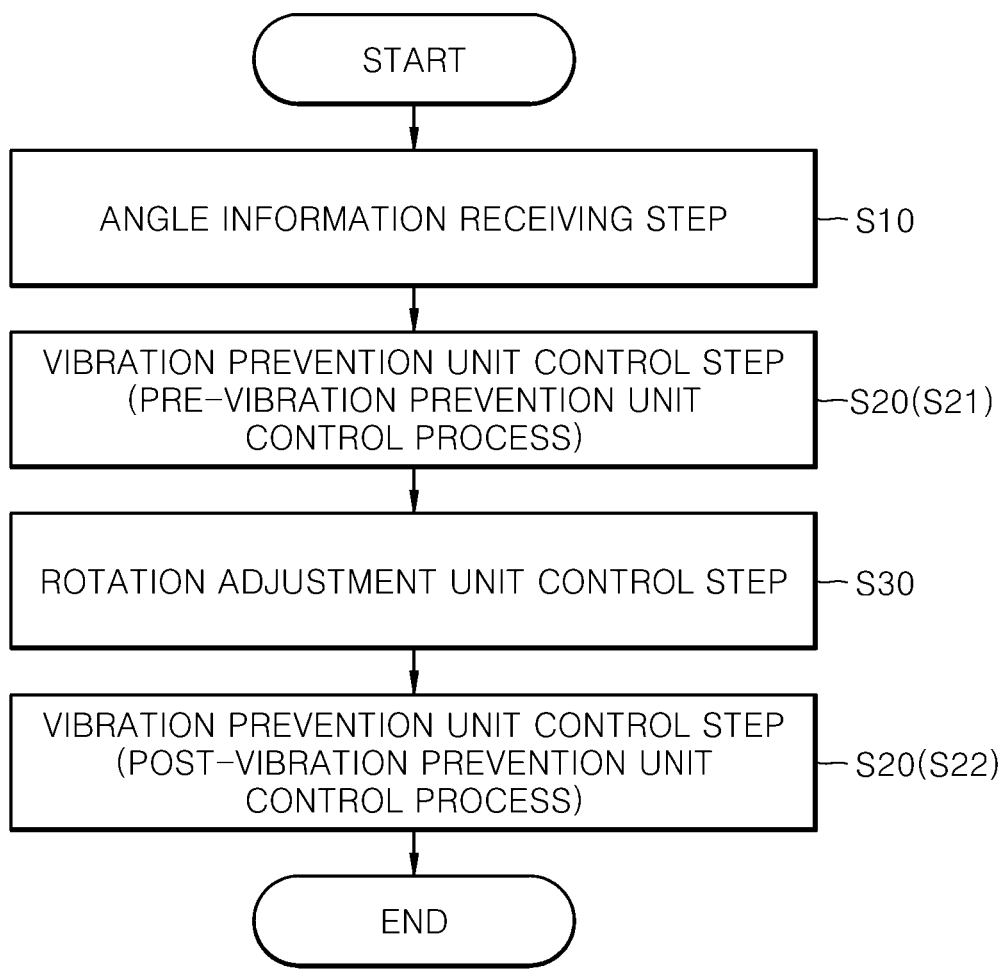
FIG. 15 is a control flowchart illustrating an embodiment of the method of controlling the antenna clamping device according to the present invention.

FIG. 15 is a control flowchart illustrating an embodiment of the method of controlling the antenna clamping device according to the present invention.

The method of controlling the clamping device for an antenna apparatus according to the embodiment of the present invention, which is performed as described above, will be organized and described below.

The method of controlling the clamping device for an antenna apparatus according to the embodiment of the present invention includes an angle information receiving step S10 of receiving information on the rotation angles of the tilting unit 100 and the tilting drive unit 200 from the remote control center, a rotation adjustment unit control step S30 of controlling the operations of the rotation adjustment units 250 and 350 on the basis of the received tilting angle of the tilting unit 100 and the received rotating angle of the tilting drive unit 200 received in the angle information receiving step S10, and a vibration prevention unit control step S20 of releasing a locked rotation state of the tilting unit 100 and the tilting drive unit 200 by controlling the operations of the vibration prevention units 270 and 370 so that the rotation adjustment unit control step S30 may be performed.

In this case, as described above, the angle information receiving step S10 may be a step in which the controller remotely receives information through the mobile communication network by the remote control center. However, the present invention is not necessarily limited thereto, and the angle information receiving step may be defined as a step in which the controller remotely receives information by using wireless communication between the remote control center and the relay device.

Meanwhile, the received angle value received in the angle information receiving step S10 may include only the information on the tilting rotation of the tilting unit 100, only the information on the rotating rotation of the tilting drive unit 200, or the information on both the rotations (i.e., the tilting rotation of the tilting unit 100 and the rotating rotation of the tilting drive unit 200) based on the information on the preset direction of the installed antenna.

In the rotation adjustment unit control step S30, the start points may be ascertained on the basis of the initially set tilting fixing position of the tilting unit 100 and the initially set rotating fixing position of the tilting drive unit 200. Therefore, the controller (motor controller) may control the operation of the tilting rotation adjustment unit 250 of the tilting unit 100 first before sequentially controlling the operation of the rotating rotation adjustment unit 350 or perform the control in the reverse order. Further, the controller (motor controller) may control the tilting rotation adjustment unit 250 and the rotating rotation adjustment unit 350.

Meanwhile, the vibration prevention unit control step S20 is a step performed before and after the rotation adjustment unit control step in a time-based manner. The vibration prevention unit control step S20 may include a pre-vibration prevention unit control process S21 to be performed before the rotation adjustment unit control step S30 and a post-vibration prevention unit control process S22 to be performed after the rotation adjustment unit control step S30.

The pre-vibration prevention unit control process S21 is a process of operating the vibration prevention units 270 and 370 to switch the state locked at the tilting fixing position or the rotating fixing position to the unlocked state before operating the rotation motors 251 and 351 of the rotation adjustment units 250 and 350 of the tilting unit 100 and the tilting drive unit 200 through the rotation adjustment unit control step S30.

On the contrary, the post-vibration prevention unit control process S22 is a process of operating the vibration prevention units 270 and 370 to switch from the unlocked state to the locked state again when the tilting unit 100 and the tilting drive unit 200 completely rotate to the tilting fixing position and the rotating fixing position on the basis of the received angle values through the rotation adjustment unit control step S30.

Further, the method of controlling the antenna clamping device according to the embodiment of the present invention may further include a rotation checking step of checking the rotating state of the antenna A by displaying, through the display unit, image data or video data detected by the image detection unit.

The rotation checking step may be defined as a step of checking whether the operation of rotating the antenna has been accurately completed by the controller on the basis of the video data related to the real-time rotating state of the antenna detected by the image detection unit or the images indicating the states before and after the antenna rotates.

As described above, the antenna clamping device according to the embodiment of the present invention includes the tilting rotation motor 251 configured to rotate the antenna A in the vertical direction, the tilting rotation prevention motor 271 configured to lock or unlock the vertical rotation of the antenna A, the rotating rotation motor 351 configured to rotate the antenna A in the horizontal direction, the rotating rotation prevention motor 371 configured to lock or unlock the horizontal rotation of the antenna A, and the controller 600 configured to adjust the direction of the antenna A by controlling the tilting rotation motor 251, the tilting rotation prevention motor 271, the rotating rotation motor 351, and the rotating rotation prevention motor 371.

The antenna clamping device according to the embodiment of the present invention may further include the information reception unit 610 configured to receive the information on the rotation angle of the antenna A transmitted from the remote control center and transmit the information to the controller 600. The controller 600 may control the tilting rotation motor 251, the tilting rotation prevention motor 271, the rotating rotation motor 351, and the rotating rotation prevention motor 371 on the basis of the information on the rotation angle of the antenna A received from the information reception unit 610.

The information reception unit 610 may receive, through the mobile communication network, the information on the rotation angle of the antenna A transmitted from the remote control center.

The information reception unit 610 may receive, through the relay device, the information on the rotation angle of the antenna A transmitted from the remote control center.

When the information on the rotation angle of the antenna A is inputted from the information reception unit 610, the controller 600 may unlock the vertical rotation of the antenna A and the horizontal rotation of the antenna A by controlling the tilting rotation prevention motor 271 and the rotating rotation prevention motor 371 and then adjust the vertical rotation angle of the antenna A and the horizontal rotation angle of the antenna A by controlling the tilting rotation motor 251 and the rotating rotation motor 351.

The controller 600 may control any one of the tilting rotation prevention motor 271 and the rotating rotation prevention motor 371 first before controlling the other of the tilting rotation prevention motor 271 and the rotating rotation prevention motor 371 and control any one of the tilting rotation motor 251 and the rotating rotation motor 351 first before controlling the other of the tilting rotation motor 251 and the rotating rotation motor 351.

The controller 600 may control the tilting rotation prevention motor 271 and the rotating rotation prevention motor 371 simultaneously and control the tilting rotation motor 251 and the rotating rotation motor 351 simultaneously.

The antenna clamping device according to the embodiment of the present invention may further include the angle detection unit (angle detection sensor) configured to detect the rotation angle of the rotary shaft of the tilting rotation motor 251 and the rotation angle of the rotary shaft of the rotating rotation motor 351. The controller 600 may adjust the vertical rotation angle of the antenna A and the horizontal rotation angle of the antenna A by unlocking the vertical rotation of the antenna A and the horizontal rotation of the antenna A and operating the tilting rotation motor 251 and the rotating rotation motor 351 until the detected angle value transmitted from the angle detection unit is equal to the received angle value transmitted from the information reception unit 610. In this case, the angle detection units may include the tilting detection unit and the rotating detection unit.

The antenna clamping device according to the embodiment of the present invention may further include the pressure detection unit (pressure detection sensor) configured to detect a pressure for locking the vertical rotation of the antenna A and a pressure for locking the horizontal rotation of the antenna A. When the controller 600 receives the information on the rotation angle of the antenna A from the information reception unit 610, the controller 600 may unlock the vertical rotation of the antenna A and the horizontal rotation of the antenna A by operating the tilting rotation prevention motor 271 and the rotating rotation prevention motor 371 until the pressure value transmitted from the pressure detection unit is smaller than a value set in the controller 600. In this case, the pressure detection units may include the tilting pressure detection unit and the rotating pressure detection unit.

After adjusting the vertical rotation angle of the antenna A and the horizontal rotation angle of the antenna A by controlling the tilting rotation motor 251 and the rotating rotation motor 351, the controller 600 may lock the vertical rotation of the antenna A and the horizontal rotation of the antenna A by operating the tilting rotation prevention motor 271 and the rotating rotation prevention motor 371 until the pressure value transmitted from the pressure detection unit is larger than a value set in the controller 600.

The antenna clamping device according to the embodiment of the present invention may further include the image detection unit configured to detect the rotating state of the antenna A as video data or image data. The controller 600 may transmit the video data or the image data, which are detected by the image detection unit, to the display unit provided on the remote control center or the display unit provided on the system terminal that operates in conjunction with the remote control center.

The antenna clamping device and the method of controlling the same according to the embodiment of the present invention configured as described above may remotely adjust the direction of the antenna A by using the remote control center (or the system terminal operating in conjunction with the remote control center) that operates by means of the mobile communication network or the relay device without requiring the operator to directly ascend to adjust the direction of the antenna A installed at a high position, thereby significantly improving operation convenience.

The embodiment of the method of controlling the antenna clamping device according to the present invention has been described above in detail with reference to the accompanying drawings. However, the present invention is not necessarily limited by the embodiment, and various modifications of the embodiment and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the antenna clamping device and the method of controlling the same, which may allow the operator to remotely adjust the direction of the antenna apparatus installed in the limited space, which improves the operation convenience.

The invention claimed is:
1. An antenna clamping device comprising:
a tilting rotation motor configured to rotate an antenna in a vertical direction;
a tilting rotation prevention motor configured to lock and unlock a vertical rotation of the antenna;
a rotating rotation motor configured to rotate the antenna in a horizontal direction;
a rotating rotation prevention motor configured to lock and unlock a horizontal rotation of the antenna; and a controller configured to adjust a direction of the antenna by controlling the tilting rotation motor, the tilting rotation prevention motor, the rotating rotation motor, and the rotating rotation prevention motor.

2. The antenna clamping device of claim 1, further comprising:
an information reception unit configured to receive information on a rotation angle of the antenna transmitted from a remote control center and transmit the information to the controller,
wherein the controller controls the tilting rotation motor, the tilting rotation prevention motor, the rotating rotation motor, and the rotating rotation prevention motor on the basis of the information on the rotation angle of the antenna received from the information reception unit.

3. The antenna clamping device of claim 2, wherein the information reception unit receives, through mobile communication network, the information on the rotation angle of the antenna transmitted from the remote control center.

4. The antenna clamping device of claim 2, wherein the information reception unit receives, through a relay device, the information on the rotation angle of the antenna transmitted from the remote control center.

5. The antenna clamping device of claim 2, wherein when the information on the rotation angle of the antenna is inputted from the information reception unit, the controller unlocks the vertical rotation of the antenna and the horizontal rotation of the antenna by controlling the tilting rotation prevention motor and the rotating rotation prevention motor and adjusts a vertical rotation angle of the antenna and a horizontal rotation angle of the antenna by controlling the tilting rotation motor and the rotating rotation motor.

6. The antenna clamping device of claim 1, wherein the controller controls any one of the tilting rotation prevention motor and the rotating rotation prevention motor first before controlling the other of the tilting rotation prevention motor and the rotating rotation prevention motor, and
wherein the controller controls any one of the tilting rotation motor and the rotating rotation motor first before controlling the other of the tilting rotation motor and the rotating rotation motor.

7. The antenna clamping device of claim 1, wherein the controller controls the tilting rotation prevention motor and the rotating rotation prevention motor simultaneously and controls the tilting rotation motor and the rotating rotation motor simultaneously.

8. The antenna clamping device of claim 5, further comprising:
an angle detection unit configured to detect a rotation angle of a rotary shaft of the tilting rotation motor and a rotation angle of a rotary shaft of the rotating rotation motor,
wherein the controller unlocks the vertical rotation of the antenna and the horizontal rotation of the antenna and then adjusts the vertical rotation angle of the antenna and the horizontal rotation angle of the antenna by operating the tilting rotation motor and the rotating rotation motor until a detected angle value transmitted from the angle detection unit is equal to a received angle value transmitted from the information reception unit.

9. The antenna clamping device of claim 8, further comprising: a pressure detection unit configured to detect a pressure for locking the vertical rotation of the antenna and a pressure for locking the horizontal rotation of the antenna,
wherein when the controller receives the information on the rotation angle of the antenna from the information reception unit, the controller unlocks the vertical rotation of the antenna and the horizontal rotation of the antenna by operating the tilting rotation prevention motor and the rotating rotation prevention motor until a pressure value transmitted from the pressure detection unit is smaller than a value set in the controller.

10. The antenna clamping device of claim 9, wherein the controller adjusts the vertical rotation angle of the antenna and the horizontal rotation angle of the antenna by controlling the tilting rotation motor and the rotating rotation motor and then locks the vertical rotation of the antenna and the horizontal rotation of the antenna by operating the tilting rotation prevention motor and the rotating rotation prevention motor until the pressure value transmitted from the pressure detection unit is larger than the value set in the controller.

11. The antenna clamping device of claim 2, further comprising: an image detection unit configured to detect a rotating state of the antenna as video data or image data,
wherein the controller transmits the video data or the image data detected by the image detection unit to a display unit provided on the remote control center or a display unit provided on a system terminal that operates in conjunction with the remote control center.

12. A method of controlling an antenna clamping device comprising a tilting rotation motor configured to rotate an antenna in a vertical direction, a tilting rotation prevention motor configured to lock and unlock a vertical rotation of the antenna, a rotating rotation motor configured to rotate the antenna in a horizontal direction, and a rotating rotation prevention motor configured to lock and unlock a horizontal rotation of the antenna, the method comprising:
unlocking the vertical rotation of the antenna and the horizontal rotation of the antenna by controlling the tilting rotation prevention motor and the rotating rotation prevention motor;
adjusting a vertical rotation angle of the antenna and a horizontal rotation angle of the antenna by controlling the tilting rotation motor and the rotating rotation motor; and
locking the vertical rotation of the antenna and the horizontal rotation of the antenna by controlling the tilting rotation prevention motor and the rotating rotation prevention motor.

13. The method of claim 12, wherein the antenna clamping device further comprises an information reception unit, and
wherein the method further comprises an angle information receiving step of receiving, by the information reception unit, information on a rotation angle of the antenna transmitted from a remote control center before the unlocking of the vertical rotation and the horizontal rotation,
wherein in the unlocking of the vertical rotation and the horizontal rotation and the locking of the vertical rotation and the horizontal rotation, the tilting rotation prevention motor and the rotating rotation prevention motor are controlled on the basis of the information on the rotation angle of the antenna received from the information reception unit, and
wherein in the adjusting of the vertical rotation angle and the horizontal rotation angle, the tilting rotation motor and the rotating rotation motor are controlled on the basis of the information on the rotation angle of the antenna received from the information reception unit.

14. The method of claim 13, wherein in the angle information receiving step, the information on the rotation angle of the antenna transmitted from the remote control center is received through a mobile communication network.

15. The method of claim 13, wherein in the angle information receiving step, the information on the rotation angle of the antenna transmitted from the remote control center is received through a relay device.

16. The method of claim 13, wherein in the unlocking of the vertical rotation and the horizontal rotation, the vertical rotation of the antenna and the horizontal rotation of the antenna are unlocked as the tilting rotation prevention motor and the rotating rotation prevention motor are controlled when the information on the rotation angle of the antenna is inputted from the information reception unit.

17. The method of claim 12, wherein in the unlocking of the vertical rotation and the horizontal rotation, any one of the tilting rotation prevention motor and the rotating rotation prevention motor is controlled first before the other of the tilting rotation prevention motor and the rotating rotation prevention motor is controlled,
wherein in the adjusting of the vertical rotation angle and the horizontal rotation angle, any one of the tilting rotation motor and the rotating rotation motor is controlled first before the other of the tilting rotation motor and the rotating rotation motor is controlled, and
wherein in the locking of the vertical rotation and the horizontal rotation, any one of the tilting rotation prevention motor and the rotating rotation prevention motor is controlled first before the other of the tilting rotation prevention motor and the rotating rotation prevention motor is controlled.

18. The method of claim 12, wherein in the unlocking of the vertical rotation and the horizontal rotation, the tilting rotation prevention motor and the rotating rotation prevention motor are simultaneously controlled,
wherein in the adjusting of the vertical rotation angle and the horizontal rotation angle, the tilting rotation motor and the rotating rotation motor are simultaneously controlled, and
wherein in the locking of the vertical rotation and the horizontal rotation, the tilting rotation prevention motor and the rotating rotation prevention motor are simultaneously controlled.

19. The method of claim 16, wherein the antenna clamping device further comprises an angle detection unit configured to detect a rotation angle of a rotary shaft of the tilting rotation motor and a rotation angle of a rotary shaft of the rotating rotation motor, and
wherein in the adjusting of the vertical rotation angle and the horizontal rotation angle, the tilting rotation motor and the rotating rotation motor are operated until a detected angle value transmitted from the angle detection unit is equal to a received angle value transmitted from the information reception unit.

20. The method of claim 19, wherein the antenna clamping device further comprises a pressure detection unit configured to detect a pressure for locking the vertical rotation of the antenna and a pressure for locking the horizontal rotation of the antenna, and
wherein in the unlocking of the vertical rotation and the horizontal rotation, the tilting rotation prevention motor and the rotating rotation prevention motor are operated until a pressure value transmitted from the pressure detection unit is smaller than a predetermined value.

21. The method of claim 20, wherein in the locking of the vertical rotation and the horizontal rotation, the tilting rotation prevention motor and the rotating rotation prevention motor are operated until the pressure value transmitted from the pressure detection unit is larger than the predetermined value.

22. The method of claim 13, wherein the antenna clamping device further comprises an image detection unit configured to detect a rotating state of the antenna as video data or image data, and
wherein the method further comprises transmitting the video data or the image data detected by the image detection unit to a display unit, which is provided on the remote control center, or a display unit, which is provided on a system terminal that operates in conjunction with the remote control center, before the angle information receiving step.

* * * * *